(12) United States Patent  
Sinai et al.

(10) Patent No.: US 7,143,042 B1
(45) Date of Patent: Nov. 28, 2006

(54) TOOL FOR GRAPHICALLY DEFINING DIALOG FLOWS AND FOR ESTABLISHING OPERATIONAL LINKS BETWEEN SPEECH APPLICATIONS AND HYPERMEDIA CONTENT IN AN INTERACTIVE VOICE RESPONSE ENVIRONMENT

(75) Inventors: Julian Sinai, Palo Alto, CA (US); Steven C. Ehrlich, Burlingame, CA (US); Rajesh Ragoobeer, San Mateo, CA (US)

(73) Assignee: Nuance Communications, Menlo Park, CA (US)

( * ) Notice: Subject to any disclaimer, the term of this patent is extended or adjusted under 35 U.S.C. 154(b) by 950 days.

(21) Appl. No.: 09/412,050

(22) Filed: Oct. 4, 1999

(51) Int. Cl.
*G10L 21/00* (2006.01)

(52) U.S. Cl. .................................. 704/270.1
(58) Field of Classification Search ........ 704/270–275; 379/88.01; 717/107; 709/229
See application file for complete search history.

(56) References Cited

U.S. PATENT DOCUMENTS

| | | | |
|---|---|---|---|
| 4,887,212 A | 12/1989 | Zamora et al. | |
| 4,974,191 A | 11/1990 | Amirghodsi et al. | |
| 5,442,780 A | 8/1995 | Takamashi et al. | |
| 5,548,631 A | 8/1996 | Krebs et al. | |
| 5,603,031 A | 2/1997 | White et al. | |
| 5,608,624 A | 3/1997 | Luciw | |
| 5,689,669 A | 11/1997 | Lynch et al. | |
| 5,692,187 A | 11/1997 | Goldman et al. | |
| 5,790,044 A | 8/1998 | Lin et al. | |
| 6,088,731 A * | 7/2000 | Kiraly et al. | ................ 709/229 |
| 6,141,724 A * | 10/2000 | Butler et al. | ................ 717/107 |
| 6,157,705 A * | 12/2000 | Perrone | .................... 379/88.01 |
| 6,173,266 B1 * | 1/2001 | Marx et al. | .................. 704/270 |
| 6,269,336 B1 * | 7/2001 | Ladd et al. | .................. 704/270 |
| 6,314,402 B1 * | 11/2001 | Monaco et al. | ............. 704/275 |

OTHER PUBLICATIONS

Montlick, Terry, "What is Object-Oriented Software", 1999 by Sofware Design Consultants, LLC, pp. 1-7.*
Java speech Grammar Format Specification, version 1.0—Oct. 1998, 19 pages.*
VoiceXML Forum, Aug. 17, 1999, pp. 1-63.*
Newton, Harry, "Newton's Telecom Dictionary", 1996 by Harry Newton, pp. 821-823.*

* cited by examiner

*Primary Examiner*—David D. Knepper
(74) *Attorney, Agent, or Firm*—Blakely, Sokoloff, Taylor & Zafman

(57) ABSTRACT

A computer-implemented graphical design tool allows a developer to graphically author a dialog flow for use in a voice response system and to graphically create an operational link between a hypermedia page and a speech object. The hypermedia page may be a Web site, and the speech object may define a spoken dialog interaction between a person and a machine. Using a drag-and-drop interface, the developer can graphically define a dialog as a sequence of speech objects. The developer can also create a link between a property of any speech object and any field of a Web page, to voice-enable the Web page, or to enable a speech application to access Web site data.

70 Claims, 14 Drawing Sheets

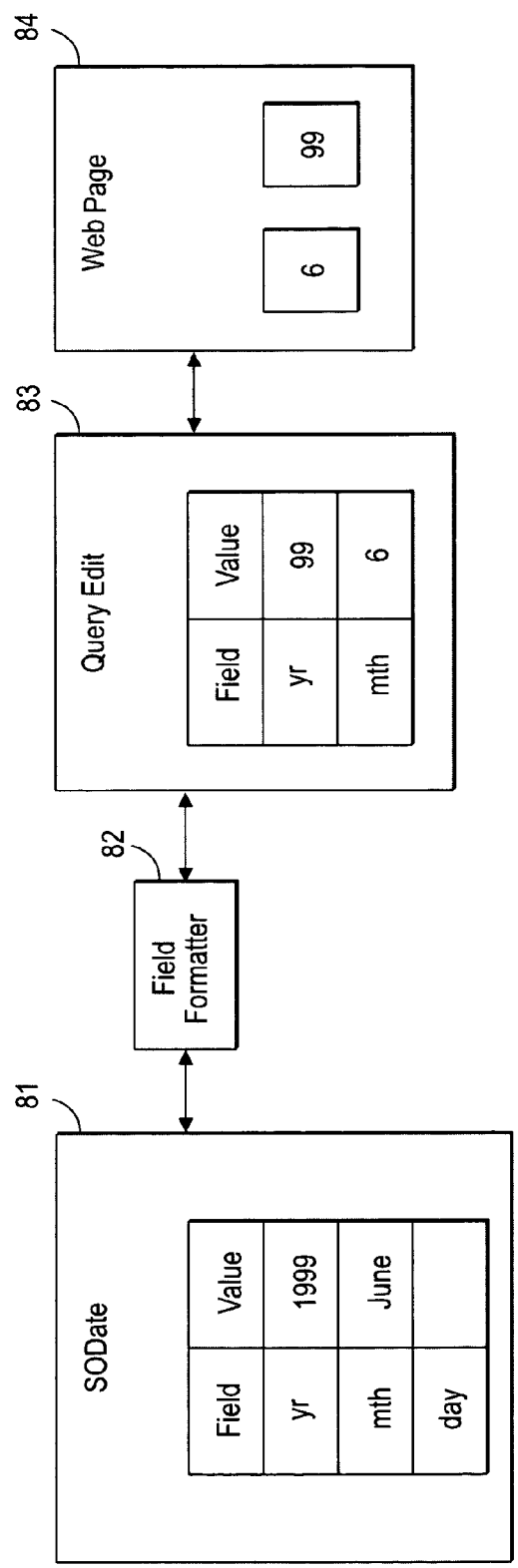
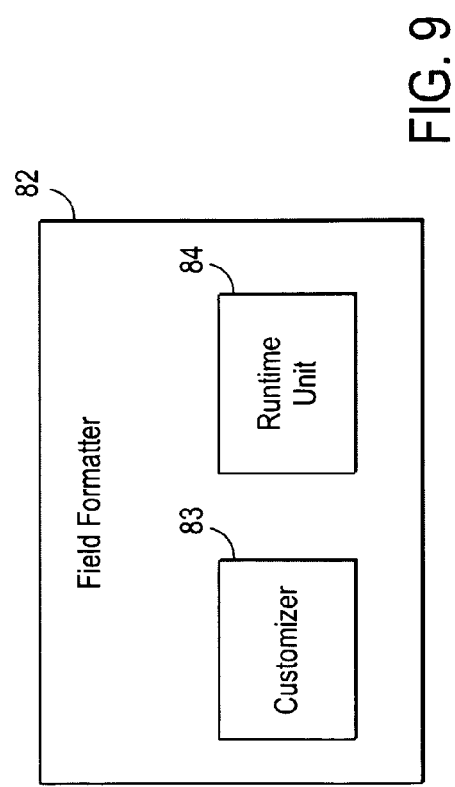
FIG. 8
FIG. 9

TOOL FOR GRAPHICALLY DEFINING DIALOG FLOWS AND FOR ESTABLISHING OPERATIONAL LINKS BETWEEN SPEECH APPLICATIONS AND HYPERMEDIA CONTENT IN AN INTERACTIVE VOICE RESPONSE ENVIRONMENT

FIELD OF THE INVENTION

The present invention pertains to machine-implemented voice response systems. More particularly, the present invention relates to techniques for allowing developers to create speech-enabled applications and to link speech applications with hypermedia content to facilitate human-to-machine dialogs.

BACKGROUND OF THE INVENTION

The use of technology for speech recognition, natural language understanding, and speaker verification is becoming increasingly more common in everyday life. One application of such technology is in voice response ("voice response") systems that are used to automate tasks that otherwise would be performed by a human being. Such systems enable a dialog to be carried out between a human speaker and a machine (such as a computer system) to allow the machine to perform a task on behalf of the speaker, to avoid the speaker or another person having to perform the task. This operation generally involves a computer system's acquiring specific information from the speaker. Voice response systems may be used to perform very simple tasks, such as allowing a consumer to select from several menu options over the telephone. Alternatively, voice response systems can be used to perform more sophisticated functions, such as allowing a consumer to perform banking or investment transactions over the telephone or to book flight reservations.

Current voice response systems commonly are implemented by programming standard computer hardware with special-purpose software. In a basic voice response system, the software includes a speech recognition engine and a speech-enabled application (e.g., a telephone banking application) that is designed to use recognized speech output by the speech recognition engine. The hardware may include one or more conventional computer systems, such as personal computers (PCs), workstations, or other similar hardware. These computer systems may be configured by the software to operate in a client or server mode and may be connected to each other directly or on a network, such as a local area network (LAN), a Wide Area Network (WAN), or the Internet. The voice response system also includes appropriate hardware and software for allowing audio data to be communicated to and from the speaker through an audio interface, such as a standard telephone connection.

There is a general need in the industry for effective tools to assist software developers in designing speech-enabled applications ("speech applications") for voice response environments. At present, developers typically custom-design speech applications for their customers. Consequently, the design process can be time-consuming and labor-intensive, and the speech applications tend to require substantial pre-release testing. These factors tend to drive up the cost of voice response systems. Further, it can be difficult for those other than experienced software developers to create speech applications. Moreover, once a speech application is created, it tends to be very difficult, if not impossible, to modify it without substantial time and expense. It is therefore desirable to enable developers to more quickly and easily design and implement speech applications.

In addition, there has been increasing interest in incorporating voice response technology into the World Wide Web ("the Web"). For example, there is interest in extending the functionality of Web sites to include voice response capability, i.e., "voice-enabling" Web sites. This would allow end-users to access Web sites, run Web applications, and activate hypertext links, by using speech over the telephone. Similarly, there is interest in enabling speech applications maintained on non-Web platforms to access data on Web sites. Therefore, what is further needed is an effective tool by which developers can quickly and easily voice-enable Web sites or enable speech applications to access Web data.

SUMMARY OF THE INVENTION

The present invention includes a computer-implemented graphical design tool that allow a computer user to graphically create an operational link between a hypermedia page and a component that defines a spoken dialog interaction between a person and a machine. The hypermedia page may be a Web site, and the component that defines the spoken dialog interaction may be a speech object. The tool may be part of an integrated package that also includes a tool for allowing a computer user to graphically create a dialog flow. Hence, the user can, through a graphical user interface, quickly and easily create a link between a property of a speech object and a field of a Web page, to voice-enable the Web page, or to enable a speech application to access Web site data. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 8 shows the functional relationships between a speech object, a Field Formatter, a Query Editor, and a Web page.

FIG. 9 shows the components of the Field Formatter.

DETAILED DESCRIPTION

Figure 1:
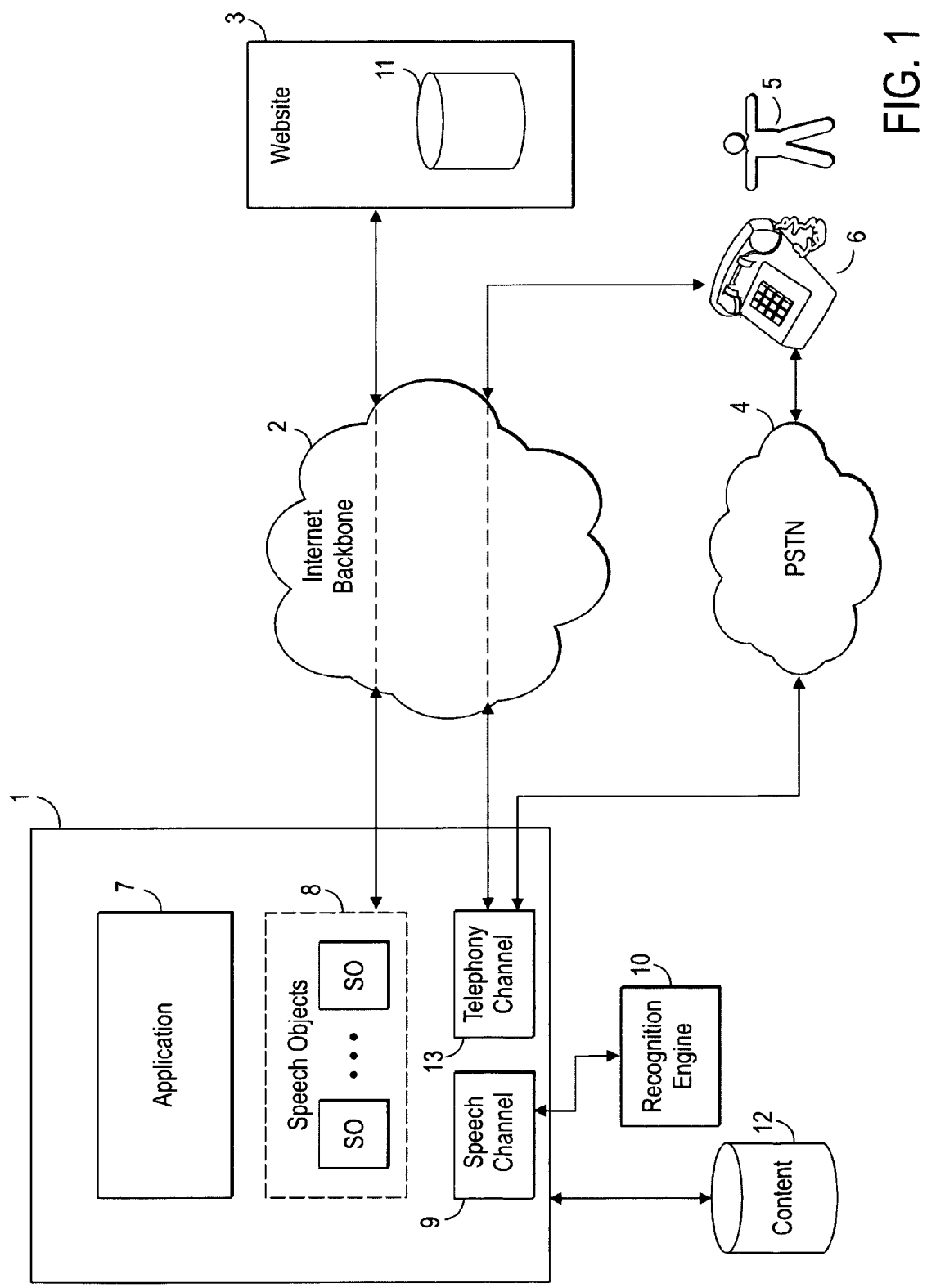
FIG. 1 illustrates an example of a voice response system.

Described below is a (Graphical User Interface) GUI-based content authoring tool for allowing a developer to graphically author a dialog flow for use in a voice response system and to graphically create operational links between speech objects and hypermedia pages, such as Web pages. Using a drag-and-drop interface, the developer can graphically define a dialog as a sequence of speech objects, each of which defines a spoken dialog interaction between a person and a machine. Using the same or a similar interface, the developer can create a link between a property of any of the speech objects and a field of a Web page, to voice-enable the Web page, or to enable a speech application to access Web site data.

I. Overview

A. Voice Response System

Before discussing the content authoring tool in detail, it is useful to consider how such content may be used in a voice response environment. Note that, as used herein, the term "voice response" (or "voice-responsive") is used to refer to any system or environment that is capable of recognizing and/or responding to human speech. Thus, these terms are not limited to, for example, systems traditionally referred to as Interactive Voice Response (IVR) systems. Accordingly, refer to FIG. 1, which illustrates an example of a voice response system. Of course, many variations on the illustrated system are possible. The illustrated system includes a voice response platform 1, which is coupled to a conventional Web site 3 through the Internet backbone 2. A developer may wish to create a speech-enabled software application (hereinafter "speech application") 7 that can access data maintained within a database 11 in the Web site 3 or speech-enabled content stored in a database 12. The application 7 may be for use by a remote user 5, who accesses the voice response platform one using a conventional telephone 6, via the Public Switched Telephone Network (PSTN) 4 or via the Internet backbone 2 using, for example, Internet Protocol (IP) telephony. Alternatively, a developer may wish to speech-enable the Web site 3, so as to allow the caller 5 to access the Web site 3 using speech through the Internet. The content authoring tool that is described herein allows a developer to equip a voice response system with such functionality.

As shown, the application 7 has access to a recognition engine 10, which performs natural language speech recognition functions such as are well-known in the art. The application 7 has access to a number of speech objects 8 maintained by the voice response platform 1, which may be loaded from the content database 12. Speech objects are objects which define spoken dialog interactions between human and machine and which, when instantiated at runtime, are used to control such dialog interactions. A speech channel 9 provides the voice response platform 1 with a communications interface with the recognition engine 10. A Telephony Channel 13 provides the voice response platform 1 with an audio interface to the telephone 6 (via the PSTN 4 or Internet backbone 2). Note that if the Web site 3 is voice-enabled, any of the speech application 7, the speech objects 8, or the speech channel 9 may be maintained at the Web site 3.

The speech objects and Speech channels referred to in this description are described in detail in U.S. patent application Ser. No. 09/296,191 of Monaco et al., entitled, "Method and Apparatus for Creating Modifiable and Combinable speech objects for Acquiring Information from a Speaker in an Interactive Voice Response System," filed on Apr. 23, 1999, which is incorporated by reference herein in its entirety. Nonetheless, to facilitate description of the content authoring tool, certain aspects of speech objects and speech channels are described below.

As used in this description, the term "content" may refer to any program code or data that is associated with a speech application or a voice-enabled Web site. For example, "content" may refer to speech objects, program code and data associated with speech objects, or hypermedia documents that reference speech objects or are referenced by speech objects. Such content may include, for example, Java code, Voice extensible Mark-up Language (VXML) code, or a combination, thereof. For purposes of this description, "VXML" refers to any XML based voice content representation, which may be VXML, VoXML, VoiceXML, or the like.

It will be apparent that, in addition to speech application 7, other components described herein may also be embodied as software, either in whole or in part, such as the content authoring tool and speech objects. To facilitate description, such software components may be described herein as "performing" or "executing" certain functions or "causing" certain functions to be performed, or other similar characterizations. It will be recognized that what is meant by such characterizations is that the stated function results from execution of the software by a processor.

B. Computer System Architecture

Figure 2:
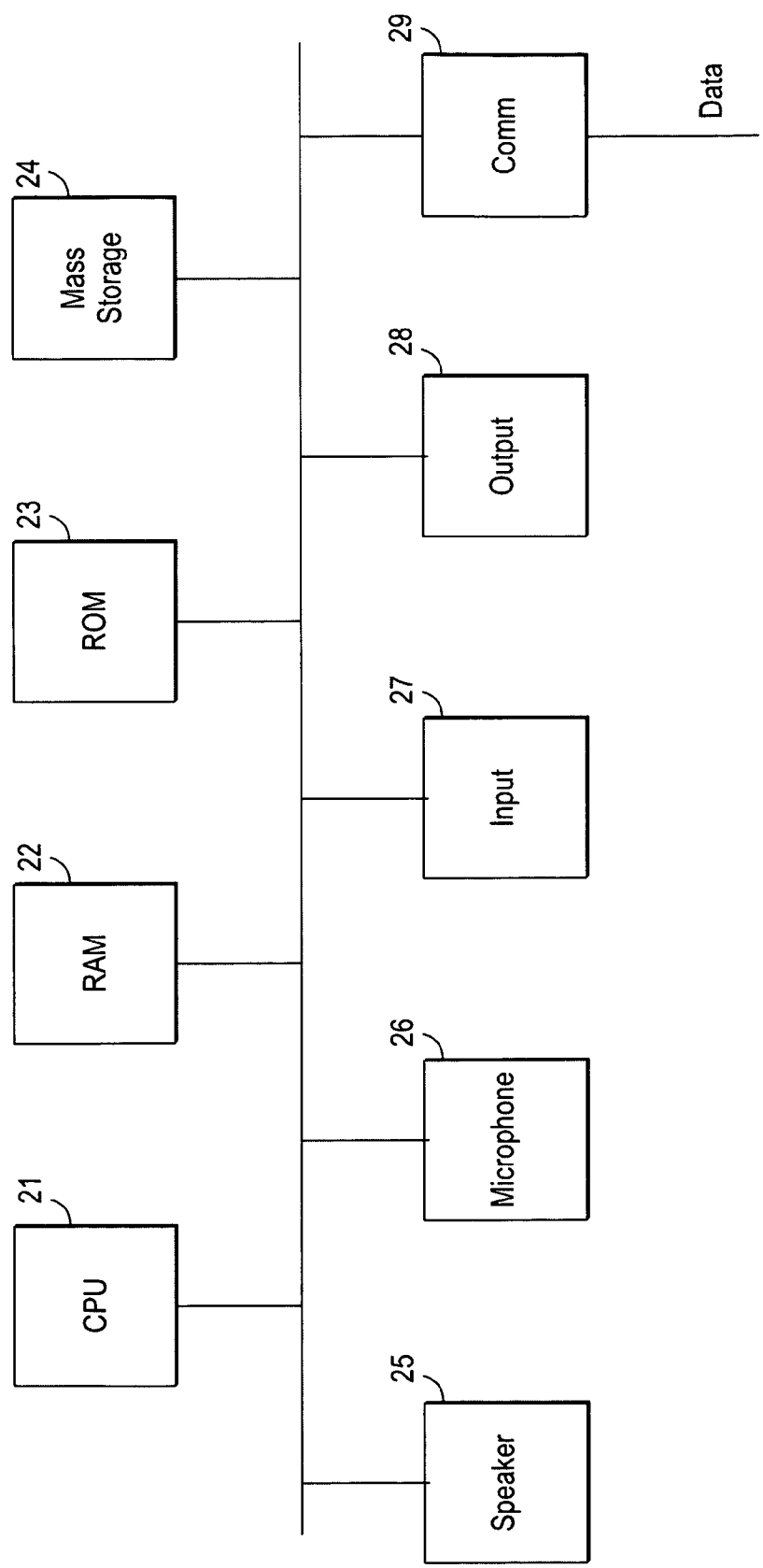
FIG. 2 is a block diagram showing an example of a computer system that may be used to implement one or more of the processing elements described herein.

The software and data elements shown in FIG. 1 (e.g., Web site 3, application 7, speech objects 8, speech channel 9, and recognition engine 10) may be implemented in two or more separate computer platforms. FIG. 2 shows, in block diagram form, an example of the hardware components of a computer system that is representative of such computer system or systems. Note that FIG. 2 is a high-level conceptual representation that is not intended to be specific to any one particular architectural arrangement. The computer system includes a microprocessor (CPU) 21, random access memory (RAM) 22, read-only memory (ROM) 23, and a mass storage device 24, each connected to a bus system 30. The bus system 30 may include one or more buses connected to each other through various bridges, controllers and/or adapters, such as are well-known in the art. For example, the bus system 30 may include a main bus, or "system bus", that is connected through an adapter to one or more expansion buses, such as a Peripheral Component Interconnect (PCI) bus, Universal Serial Bus (USB), an IEEE (Institute of Electrical and Electronics Engineers) 1394 bus, or the like.

As shown, various peripheral devices may be coupled to the bus system 30, such as an audio speaker 25, a microphone 26, and a data communication device 29. Depending on its intended use, the computer system may also include one or more other input devices 27 (e.g., keyboard, pointing device, audio telephony interface, etc.) and/or output devices 28 (e.g., display device, etc).

The mass storage device 24 may include any suitable device for storing large volumes of data, such as a magnetic disk or tape, magneto-optical (MO) storage device, or any of various types of Digital Versatile Disk (DVD) or compact disk (CD-X) storage. The data communication device 18 may be any device suitable for or enabling the computer system 1 to communicate data with another computer system over a communication link 7, such as a conventional telephone modem, cable modem, satellite modem, Integrated Services Digital Network (ISDN) adapter, Digital Subscriber Line (xDSL) adapter, Network Interface Card (NIC), Ethernet adapter, or the like.

Of course, many variations on the system of FIG. 2 will also support the techniques and features described herein. Hence, components may be added to those shown in FIG. 2, and components shown in FIG. 2 may be omitted, as appropriate for the application.

II. Speech Objects

As noted above, before describing the content authoring tool, it is useful to describe certain aspects of speech objects. As referred to herein, a "speech object" (FIG. 1) is a component for controlling a discrete piece of conversational dialog between a speaker and a voice response system. A speech object may be designed to acquire a particular type of information from the speaker. Hence, in a simple form, a speech object may simply play a prompt, wait for an utterance from the speaker, recognize the utterance (using the recognition engine 10), and return the result of the recognition operation to a speech application. For example, a simple speech object may be designed to acquire a simple "yes" or "no" response from the speaker to a particular prompt. As another example, a speech object may be designed to acquire a particular type of date, such as a flight departure date, from the speaker.

The speech objects referred to herein may be created and used hierarchically. Hence, a speech object may be a user-extensible class, or an instantiation of such a class (i.e., an object), defined in an object-oriented programming language, such as Java or C++. Accordingly, speech objects may be reusable software components, such as JavaBeans or ActiveX components. To facilitate description, it is henceforth assumed that speech objects are implemented in this way, using Java.

Each speech object includes various "properties", such as prompts and grammars, associated with a corresponding type of dialog interaction. A speech object further includes logic for controlling an interaction with the speaker when executed in a computer in the voice response system. Additional properties can be added to a speech object by creating one or more subclasses of the speech object, or by altering its properties at runtime, to create customized speech objects. In addition, multiple speech objects, each for acquiring a particular type of information from the speaker, can be combined to form a compound speech object.

It may be desirable for certain speech objects to be usable with any of various different voice response platforms. Similarly, it may be desirable to provide "pre-packaged" sets of speech objects, which developers can select from when developing speech applications.

Speech objects may be based on a primary Java interface, referred to herein as the Speech Object (or SpeechObject) interface, which provides basic default functionality and/or functionality that is common to all speech objects. In at least one embodiment, this simple interface defines a single method, Invoke, that applications call to run a speech object, and an inner class, Speech Object.Result, which is used to return the recognition results obtained during a dialog executed by the speech object. From the Speech Object interface, developers can build objects of any complexity that can be run with a single call. The Invoke method for any given speech object executes the entire dialog for the speech object. A simple Invoke method could simply play a standard prompt, wait for speech, and return the results after recognition completes. A more complicated Invoke method could include multiple dialog states, smart prompts, intelligent error handling for both user and system errors, context-sensitive help, and any other features built in by the developer. To call a speech object from the speech-enabled application, however, does not require that the developer know anything about how the Invoke method is implemented. The developer only needs to provide the correct arguments and know what information he wants to extract from the results.

A speech object can be created as a subclass of an existing speech object to create a more-specialized speech object. For example, a speech object for acquiring a flight departure date from a prospective traveler might be defined as a subclass of a more generic speech object for acquiring any type of date. Similarly, a speech object can also be constructed from multiple pre-existing speech objects—such a speech object is referred to as a compound speech object. For example, a compound speech object for acquiring flight information from a prospective traveler might be constructed from multiple separate speech objects, each for acquiring a different type of information (e.g., departure time, departure date, arrival time, arrival date, etc.).

A speech object may use various supporting objects to maintain state information across an application and to obtain access to the rest of the voice response system. As with the speech objects themselves, each of these supporting objects may be defined as Java classes. These supporting objects are passed to the Invoke method for each speech object. In some cases, these objects are modified by a call to an Invoke method or by other application events, providing information that can be used subsequently by other speech objects. These supporting objects may include objects referred to as the speech channel (see FIG. 1), the telephony channel, the Results/KVSet, the Dialog Context, playables, and processing objects, which will now be described.

A. Speech Channel

As noted above in connection with FIG. 1, the voice response platform 1 includes the speech channel 9. The speech channel 9 is a supporting object which essentially forms a bridge between the speech application 7 and the recognition engine 10 that is used to recognize the speaker's speech. Essentially, the speech channel 9 is a handle to the recognition engine 10. The speech channel interface defines the abstract protocol for all speech channel objects, including methods for recognizing speech, managing and playing the current prompt queue, recording, setting and getting recognition parameters, installing and manipulating dynamic grammars, and performing speaker verification.

B. Telephony Channel

The voice response platform 1 also includes the Telephony Channel 13. The Telephony Channel 13 is a supporting object which essentially forms an audio interface between the speech application 7 and the remote speaker (user) 5. When a telephone call is received by the voice response platform 1, the Telephony Channel 13 answers the call. Essentially, the Telephony Channel 13 is a handle to the speaker with whom a speech object is supposed to interact. The application 7 uses the Telephony Channel 13 to interact with the caller.

C. Results/KVSet

The Invoke method of the speech object returns recognition results using an implementation of a base class known as Speech Object.Result. Typically, each speech object subclass provides its own implementation of the Result class. The Result class extends a utility class referred to as KVSet. A KVSet object is simply a set of keys (Strings) with associated values, i.e., a set of key/value pairs. Hence, the KVSet class provides a flexible structure that allows the speech object to populate the Result object with any set of values that are appropriate. These values might be, for example: 1) simple values, such as a String (a name or account number) or an integer value (an order quantity); 2) other object values, such as a Java Calendar object; or 3) another KVSet object with its own set of key/value pairs. This approach allows for nested structures and can be used for more complex recognition results. Hence, Result is a specialized type of KVSet that is used to encapsulate natural language slots and the values they are filled with during recognition operation. For example, a speech object for retrieving a simple "yes" or "no" utterance may return a Result with a single slot. The key for the slot may be, for example, "YesNoKey", and the value may be another string, i.e., "yes" or "no".

D. Dialog Context

Another type of supporting Object associated with speech objects is referred to as a Dialog Context. Dialog Context is a KVSet subclass used to accumulate information about a dialog across multiple speech objects used by a single application. This object may be used to encapsulate semantic information related to the content of the dialog. The actual usage of the Dialog Context argument is speech object-specific. Accordingly, the Dialog Context object can capture dialog context information that can be used to direct the dialog appropriately.

E. Playables

By implementing the appropriate interface, referred to herein as the Playable interface, an object can be implemented such that, when invoked, it plays itself to the speaker through an audio device (e.g., the telephone network). An object implementing the Playable interface is referred to herein as a "playable". The Playable interface allows objects to be appended to a prompt queue and then played by the speech channel. Hence, a Result object such as described above may be a playable that can be played back to the speaker in this manner.

F. Processing Objects

It may be necessary to associate additional processing logic with certain speech objects, although such logic need not be integral with any particular speech object. Such processing logic may be packaged as one or more separate and processing objects, which may execute in conjunction with the execution of speech objects. In addition, a compound speech object may include one or more processing objects, which may be executed as part of execution of the compound speech object.

III. Content Authoring Tool

Figure 3:
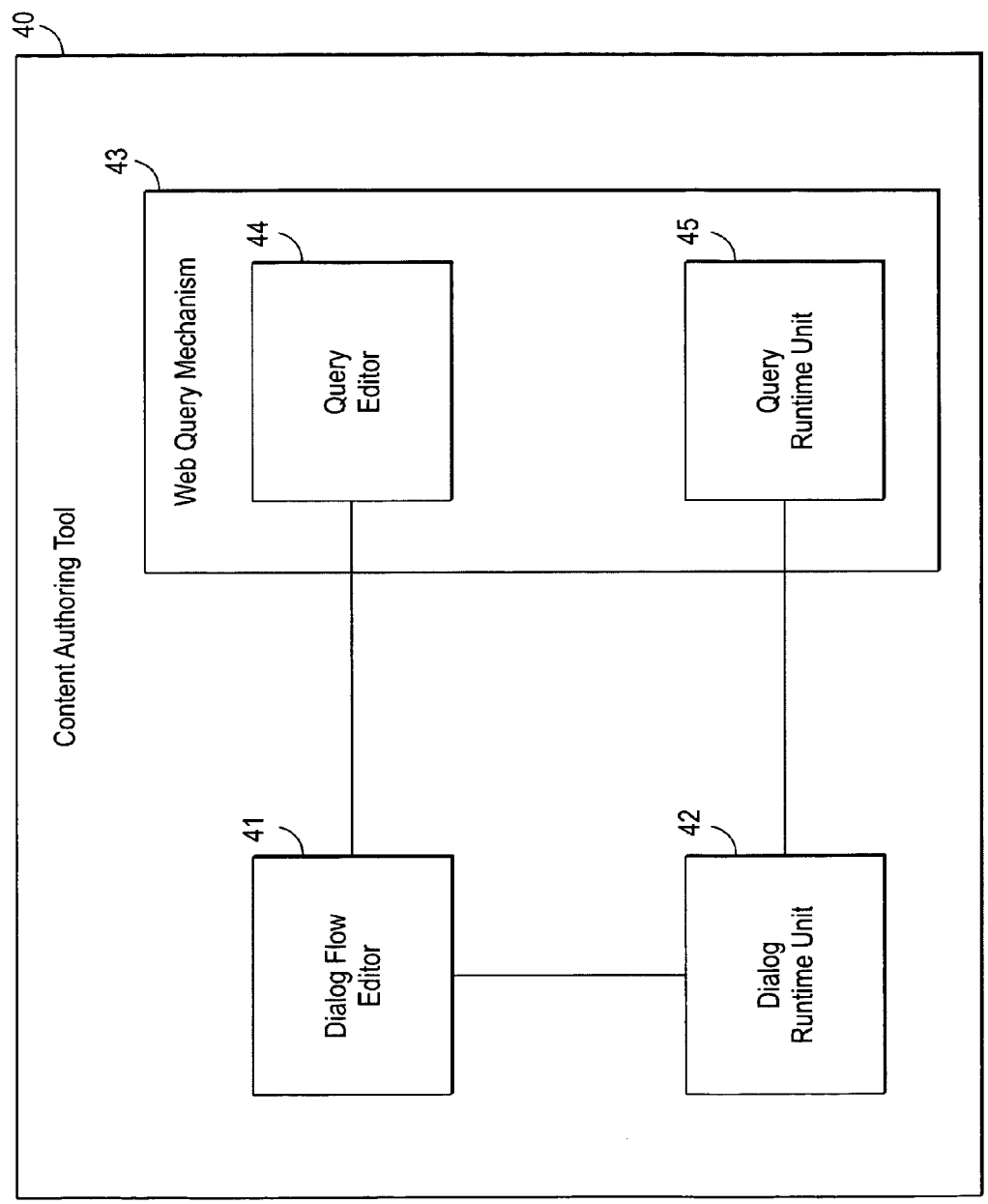
FIG. 3 shows a content authoring tool for allowing a developer to graphically author a dialog flow and/or to graphically link hypermedia pages with speech objects.

As noted above, the GUI-based content authoring tool allows a developer to graphically author a dialog flow for use in a voice response system and to graphically create operational links between Web pages and speech objects. Refer now to FIG. 3, which illustrates the content authoring tool 40, in accordance with at least one embodiment. In at least one embodiment, the tool 40 is a GUI based software application, and the following description assumes such an embodiment. Accordingly, the tool 40 may be written in any programming language suitable for generating a GUI environment for enabling a user to graphically manipulate objects on a display using, for example, a pointing device. Hence, the tool 40 may be written in Java, as is henceforth assumed in this description. In alternative embodiments, however, other programming languages might be used, such as C++. The tool 40 provides a speech object-centric integrated development environment (IDE) allowing developers to manipulate prompts, grammars, and dialog flow to create speech application content. In at least one embodiment, this content, whether an entire application or just a sub-dialog, is packaged using VXML and (Java-based) speech objects. The tool 40 provides a toolbar of known speech objects, which can be incorporated into new dialogs verbatim or with modifications. Dialog flow can be edited graphically. In at least one embodiment, dialogs are stored as VXML scripts; however, in the alternative embodiments, dialog flows can be stored using other representations, such as Java code, Java properties, binary data structures, etc.

Referring still to FIG. 3, the tool 40 includes a dialog flow editor 41, a dialog runtime unit 42, and a Web query mechanism 43, functionally coupled to each other. The Web query mechanism 43 includes a query editor 44 functionally coupled to the dialog flow editor 41, and a query runtime unit 45 functionally coupled to the dialog runtime unit 42. The function of the dialog flow editor 41 is to allow a developer to graphically create a dialog flow based on a set of selectable speech objects, which may be a "pre-packaged" set of speech objects, as noted above. The function of the dialog runtime unit 42 is to enable the developer to execute a dialog being assembled using the dialog flow editor 41, such as for testing and debugging purposes. The Web query mechanism 43 generates a GUI that enables the developer to functionally link a speech application with data from a Web site. More specifically, the Web query mechanism 43 provides a separate editor 44 that allows a developer to configure a speech application to automatically access data maintained on a Web site when executed. The Web query mechanism 43 also allows a developer to voice-enable a Web site. These functions are described in greater detail below.

Note that the Web query mechanism 43 may be packaged separately from the content authoring tool 40. That is, the content authoring tool 40 may be implemented entirely without the Web query mechanism 43 in certain embodiments, and the Web query mechanism 43 may be implemented as a separate package, without the content authoring tool 40.

A. Creation of Dialog Flows

The dialog flow editor 41 is a drag-and-drop module that graphically displays a VXML-based dialog, allows editing, generates new VXML corresponding to the modified dialog, and saves the modified dialog as VXML content. In a least one embodiment, the editor 41 has two main tabbed windows, one showing the dialog as text (VXML), and another rendering the dialog graphically. In such embodiments, the editor 41 supports two-way editing, so that both windows operate on the same internal representation, and changes made in either pane are immediately reflected in the other window. The dialog flow editor 41 enables data relating to speech objects (e.g., prompts, grammars, results, and other properties) to be exposed in a visual way.

Figure 4:
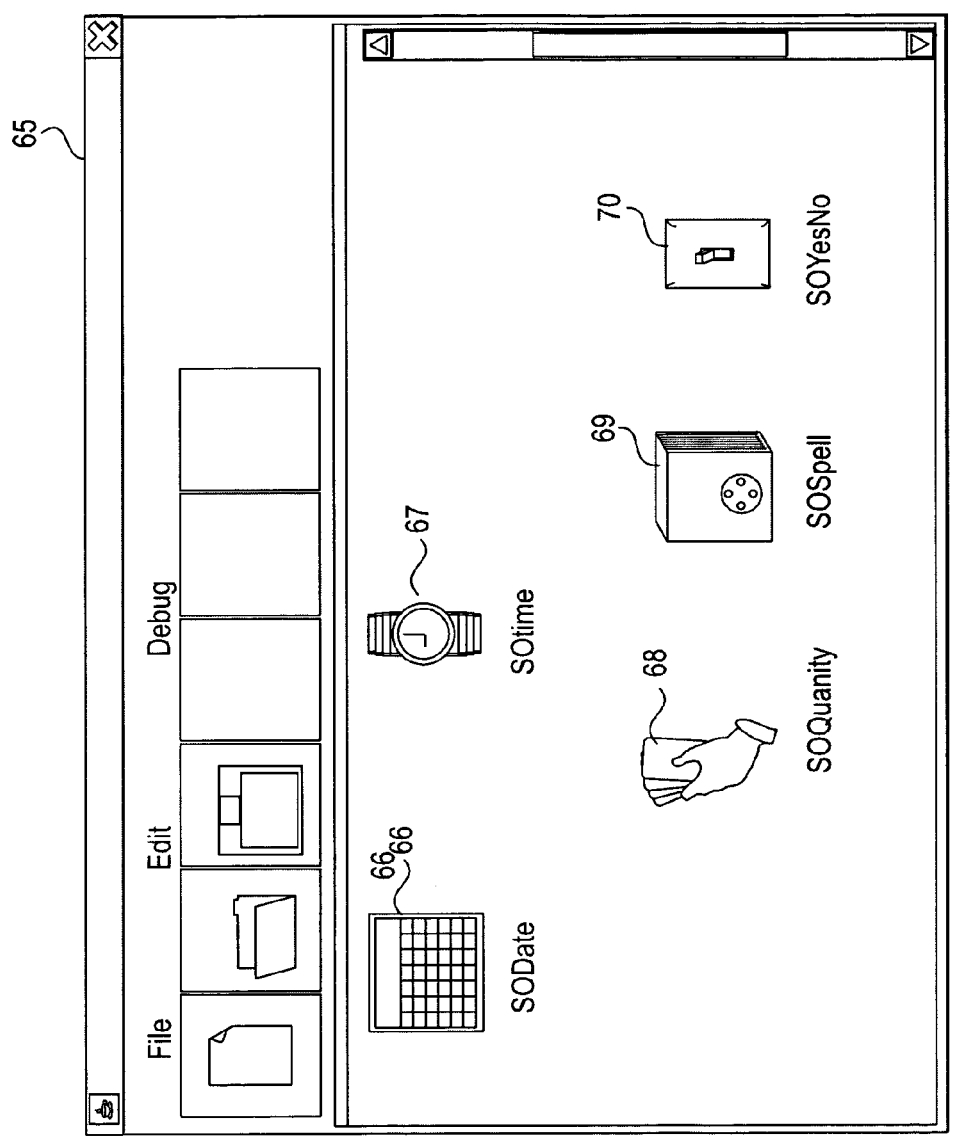
FIG. 4 illustrates an example of a dialog flow displayed in a display window generated by the dialog flow editor.
Figure 6:
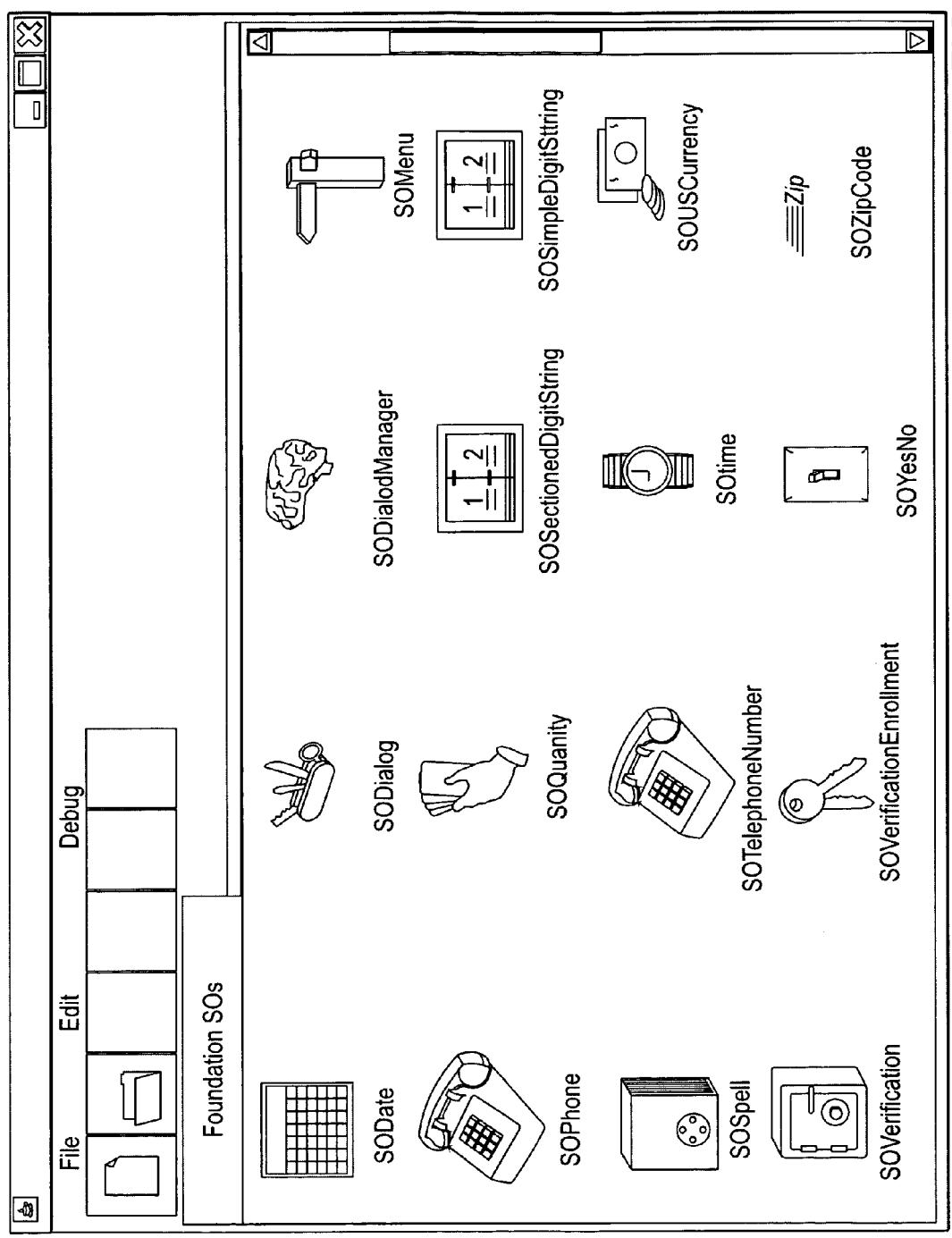
FIG. 6 illustrates an example of a displayable speech object palette from which a user can select from a number of speech objects.

The graphical representation of a dialog is a left-to-right and top-to-bottom flowchart, in which boxes or other appropriate icons correspond to dialog steps, i.e., speech objects, processing objects, etc., and diamonds or other appropriate icons correspond to case statements. (A switch statement is made up of multiple case statements.) FIG. 4 illustrates an example of a window 65 displaying such a graphical representation, for a simple dialog flow having no case statements. The illustrated dialog flow includes icons 66–70, each of which represents a different speech object. In at least one embodiment, the developer drags and drops speech objects from a speech object palette (a window) onto the editor canvas (window). FIG. 6 shows in an example of a speech object palette. As shown, the palette includes a number of icons, each representing a different speech object or supporting object.

The user can only drop an object in positions where the object will have another object connected to it on its left. When the developer drags and drops a speech object from the palette onto the editor window, the dialog flow editor 41 automatically causes a transition with the object that is to its left to be established and represented visually. Thus, the user does not have to explicitly create transitions between objects. An object can have one or more entry transitions (more than two can appear as aliases because of "goto" statements from other parts of the dialog to that object) but only have one exit transition, unless it is a switch statement, which has multiple exit transitions.

In a least one embodiment, the first block at the top left of the dialog window is always a "Start" block, and all dialog flows end in an "End" block. The End block can be configured to be a return, and end, or an off-page transition, i.e., a Uniform Resource Locator (URL) (a specific URL object may be used for this). In such embodiments, a new dialog editing window contains a Start block joined to an End block. There can be any number of these objects in a given dialog flow. In this way, dangling transitions are avoided.

Figure 5:
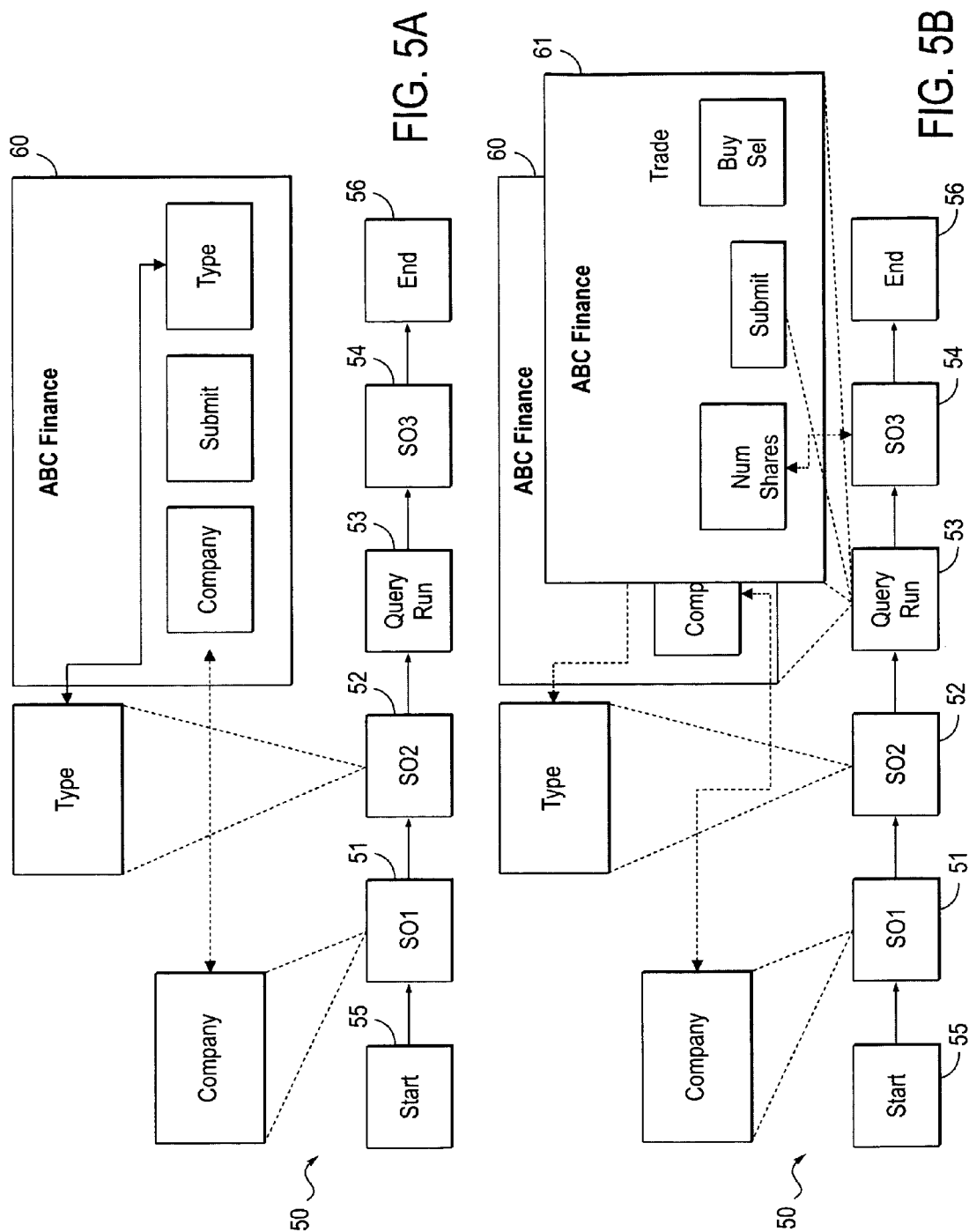
FIGS. 5A and 5B illustrates how a QueryEdit processing object can be incorporated into a dialog flow to establish links between Web pages and speech objects.

FIG. 5A shows an example of a dialog flow. The dialog flow 50 includes a Start box 55, an End box 56, and boxes 51, 52, 53, and 54 disposed in a chronologically-based sequence between the Start box 55 and the End box 56. The boxes 51, 52 and 54 represent different speech objects. Box 53 represents a processing object (referred to herein as QueryRun) associated with the Web query mechanism 43 for linking the dialog flow 50 to a Web page 60. As shown in FIG. 5B, a single instance 53 of QueryRun can support multiple Web pages 60 and 61. The Web query mechanism 43 and QueryRun are described further below.

To edit a switch, the developer double-clicks the switch block, bringing up a window to edit the cases that make up the switch. The exit conditions are shown as line segments exiting from a vertical line that drops down from the switch block, like a hair comb. Loops may be achieved by object aliases, meaning that an object can appear more than once on the canvas, and the aliases will be accented visually. No transitions can exit an alias, in order to enforce the rule that only one transition can exit an object. The user can create an alias by, for example, right-clicking on the object and selecting from a pop-up menu, or by dragging and dropping the object while holding down the "Ctrl" key on the keyboard.

Figure 7:
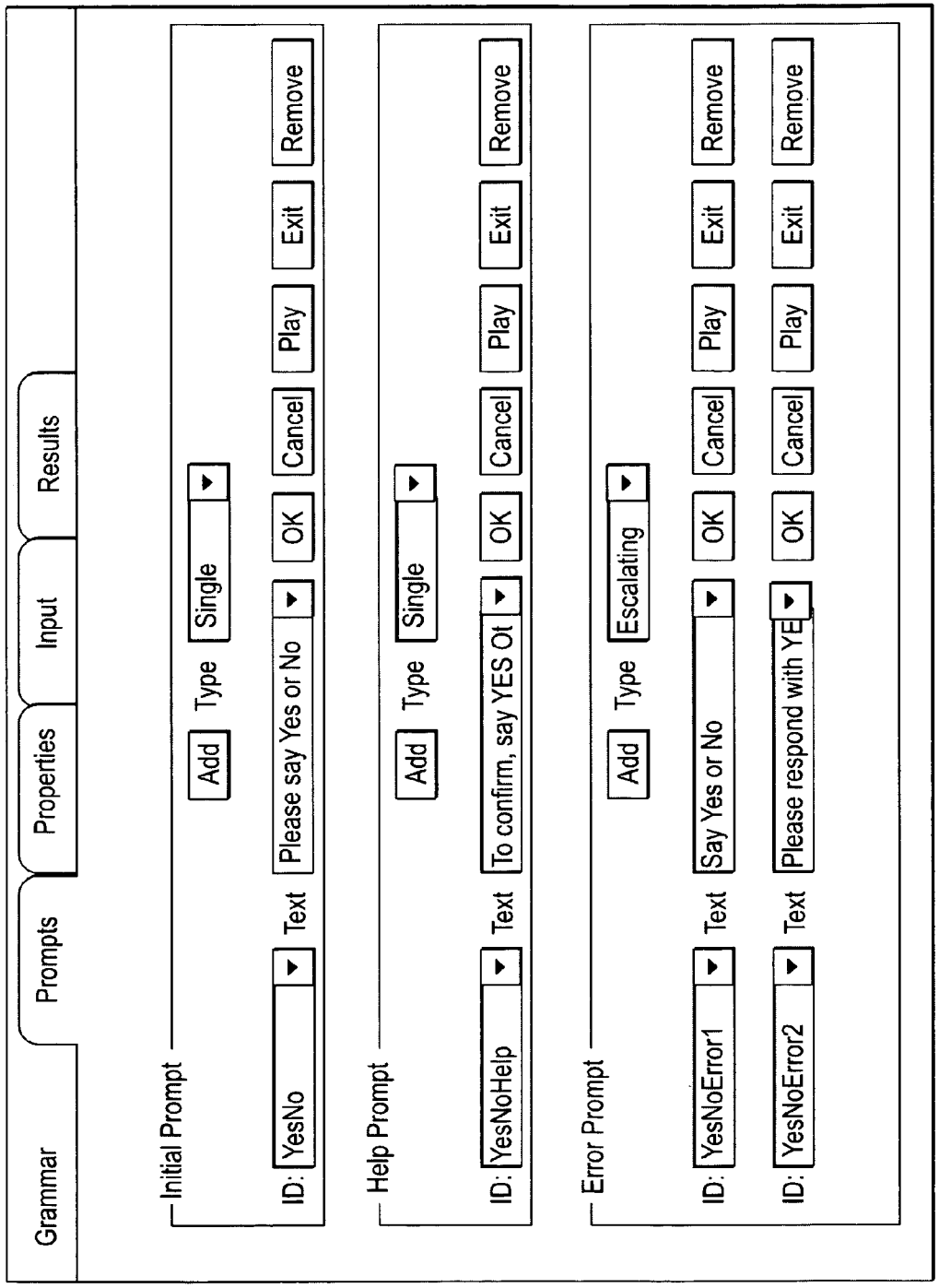
FIG. 7 shows a customizer associated with a speech object.

Double-clicking on a box in a displayed dialog flow causes a "customizer" (a Java-based GUI) to be displayed for that object in a new window. FIG. 7 shows example of a customizer for a typical object. The customizer allows the developer to modify the public properties of the object. The properties may be organized into tabbed panes, as shown, entitled for example, "Grammar", "Prompts", "Properties", "Input", and "Results". A customizer has almost no API requirements; it is simply a package of property editors. Each of these property editors allows persistence as VXML.

If a customizer is not available for a given object, a text editor is presented instead, containing the VXML corresponding to that object in the flow, and allowing the user to edit it as text. The customizers is shown in a frame with "OK" and "Cancel" buttons. If "OK" is selected, the VXML for that object is generated, and contributed back to the main VXML editor, causing the main VXML editor to be "dirty", which is shown with am appropriate indicator (e.g., the symbol "*") in the title bar. If a customizer window is closed via the title bar icon, a dialog box provides the options "OK", "Discard changes", and "Continue editing". The VXML editor will have an indication in its title bar or elsewhere to indicate the dialog flow has changed (or any of the embedded components have been modified) and needs to be saved.

As indicated above, all of the known speech objects available to the content authoring tool 40 may appear on a floating Toolbox palette, such as shown in FIG. 6. These objects can be dragged into the editor window, dropped at the desired locations, and modified by double-clicking. The Toolbox may include speech objects from various speech object suites that have been imported into the tool 40. The suites may be organized into tabbed windows, with each tab representing a suite.

Referring again to FIG. 3, the dialog runtime unit 42 enables the developer to run a dialog flow that is being developed with the click of a button. This allows developers to test their dialogs from the desktop without leaving the IDE. It is possible to start execution of a dialog flow from any of the VXML files in a project, however, the default is index.vxml. As execution of the dialog progresses, the speech object in use is highlighted. If the speech object in use is in a sub-dialog, it is opened and the speech object in use is highlighted.

Figure 12:
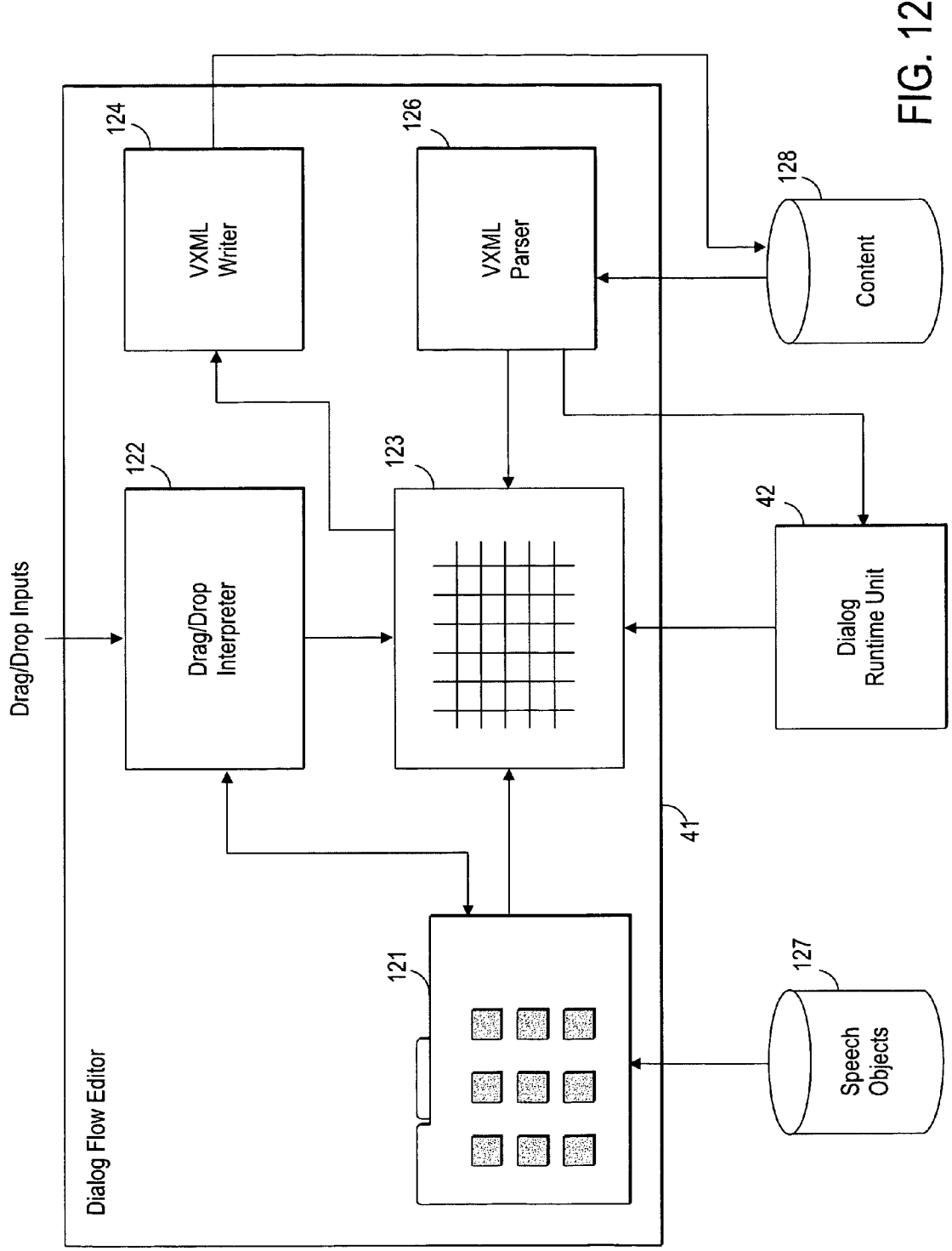
FIG. 12 is a block diagram showing the components and operation of the dialog flow editor and the dialog runtime unit.

FIG. 12 further illustrates the components and operation of the dialog flow editor 41 and the dialog runtime unit 42 (FIG. 3), according to at least one embodiment. The dialog flow editor 41 includes a Toolbox 121 (a palette), a drag-and-drop interpreter 122, a display grid 123, a VXML writer 124, and a VXML parser 126. The Toolbox 121 displays icons representing speech objects that are stored in database 127. The drag-and-drop interpreter 122 receives drag-and-drop type user inputs directed to the toolbox 121 and the grid 123. The grid 123 includes objects placed into the dialog flow and is modified according to these user inputs. The interpreted user inputs are provided by the drag-and-drop interpreter 122 to the VXML writer 124. The VXML writer generates VXML representing the current state of the grid and stores the dialog flow (VXML and speech objects) as content in database 128. As noted above, the speech objects may be Java objects; however, the speech objects are functionally "connected" by VXML to form a complete dialog. Hence, content database 128 may include both Java and VXML code. The VXML parser 126 reads content from the database 128 and parses the content into a format that is usable by the grid 123 and the runtime unit 42, such as Java data structures. When the dialog being developed is executed by the developer, the VXML parser 126 accesses the appropriate content in database 128 and provides it to the runtime unit 42 for execution. The runtime unit 42 communicates with the grid 123 to appropriately modify the grid 123 for display purposes (for example, by highlighting the currently active speech object).

B. Web Functionality—Web Query Mechanism

The Web query mechanism 43 enables a developer to functionally link a dialog flow with a Web page. More specifically, the Web query mechanism 43 enables the developer to map fields of Web pages (e.g., HTML fields) to properties of speech objects. This capability can be used to enable a speech application to access Web data or to voice-enable a Web page.

Referring again to FIG. 3, the Web query mechanism 43 includes a design-time module, i.e. the query editor 44, and a runtime module, i.e. the query runtime unit 45. These two modules are instantiated in the form of two types of objects, QueryEdit and QueryRun, respectively. QueryRun has the ability to read and interpret VXML content containing query parameters and to execute a query against a hypermedia site at runtime using those parameters. QueryEdit is a customizer for QueryRun. QueryRun is a processing object (see above) that can be incorporated into a dialog flow.

Referring again to FIGS. 5A and 5B, box 53 represents a QueryRun object. To incorporate an instance of QueryRun into a dialog flow, the developer drags an instance of QueryRun from the Toolbox palette and drops it into the displayed dialog flow. When the developer double clicks on that instance, an instance of QueryEdit is activated by the query editor 44 to allow the instance of QueryRun to be customized. The query editor 44 generates a browser window representing QueryEdit, which is displayed with any windows generated by the dialog flow editor 41.

FIGS. 5A and 5B also show how the QueryRun object can be used. These figures illustrate an example in which the dialog flow is used to access a Web page 60 that will return a stock price quote for a given "company" query. A first speech object "SO1" (box 51) in the dialog flow 50 is designed to (audibly) acquire a company name from a speaker; accordingly, speech object SO1 is mapped to a "Company" field 57 of the Web page 60. The second speech object "SO2" (box 52) is designed to (audibly) acquire a type of stock quote selection from the speaker; accordingly, speech object SO2 is map to a "Type" field 58 of the Web page 60.

The QueryRun processing object (box 53) is designed to initiate the stock quote query in response to receiving the company name and quote type acquired by the "upstream" speech objects SO1 and SO2, respectively, and to return the stock price to the immediately "downstream" speech object "SO3" (box 54). Speech object SO3 may be, for example, a playable such as described above, which "speaks" the returned stock price to the user. Note that the results of each speech object are actually passed to subsequent objects in the dialog flow by an instance of Dialog Context, described above.

A single instance of QueryEdit may be used to map fields on multiple Web pages to speech objects in a given dialog flow, as long as the flow is linear. If any branching needs to occur, this is accomplished using the dialog flow editor 41 (FIG. 3). Note that QueryEdit requires no knowledge of speech objects, just as speech objects require no built in knowledge about QueryEdit. The tool 40 provides the VXML "glue" which binds the speech objects in a dialog together.

Using QueryEdit, various types of input fields may be mapped to speech object properties, such as single-value lists (e.g., drop-downs, radio buttons, etc.), multi-value lists (e.g., list boxes, from which one can "control-click" to select more than one item), Boolean values (e.g., check boxes), text boxes, and hyperlinks. Output fields may include any type of fields that can be played audibly or modified to play audibly. Accordingly, QueryEdit includes a user interface which allows the developer to specify text on a Web that will be played to a user (as a query result) using text-to-speech (TTS) conversion or recorded speech. Further, QueryEdit allows the developer to annotate such text with special-purpose characters or marks to provide for better playback. Such annotations may be used to control voice style, prosody, and other parameters during playback.

Graphical mapping of HTML fields to speech object properties is accomplished by the developer's dragging and dropping between a field in one customizer to a field in another customizer. One of the customizers belongs to the speech object, and the other belongs to an instance of QueryEdit. The process of graphically mapping HTML fields to speech object properties creates a shared name space and type space between QueryEdit and the content authoring tool 40. For example, if the user drags the date from an instance of a speech object SODate to a Web page, a default key name is given to the field, e.g. strDate1, and the type is string (all data interaction will be in the form of strings). At runtime, this key/value pair will be passed in the Dialog Context from SODate to QueryRun.

When the developer clicks on a speech object property in the dialog flow editor 41 that has been mapped to HTML fields, and if that Web page's customizer is open, then the HTML fields will become highlighted. Similarly, if the user clicks first on the HTML fields, the speech object property will become highlighted. If the dialog flow maps to more than one Web page, then the corresponding Web page will be displayed by QueryEdit before the HTML field is highlighted. This may be accomplished by the Web query mechanism 43 installing a listener with the tool 40. Hidden fields may be mapped either visually or automatically.

In at least one embodiment, the dialog flow editor 41 and QueryEdit cooperate so that the developer is not required to explicitly select, from the speech object palette, speech objects to be incorporated into the dialog flow. More specifically, a mechanism is provided which essentially "guesses" the appropriate speech object when the developer selects a field of the Web page and drags it into the dialog flow. The guess may be based on the name of the field, the field's contents, its context, or any other information that is available. For example, the speech object whose name is most similar to the name of the field may be chosen as the best guess (e.g., if the field name is "airport", the speech object "SOAirport" might be the best guess). Of course, the user is given the opportunity to accept the choice or to override it by choosing another speech object. This functionality is illustrated in FIG. 15.

Figure 15:
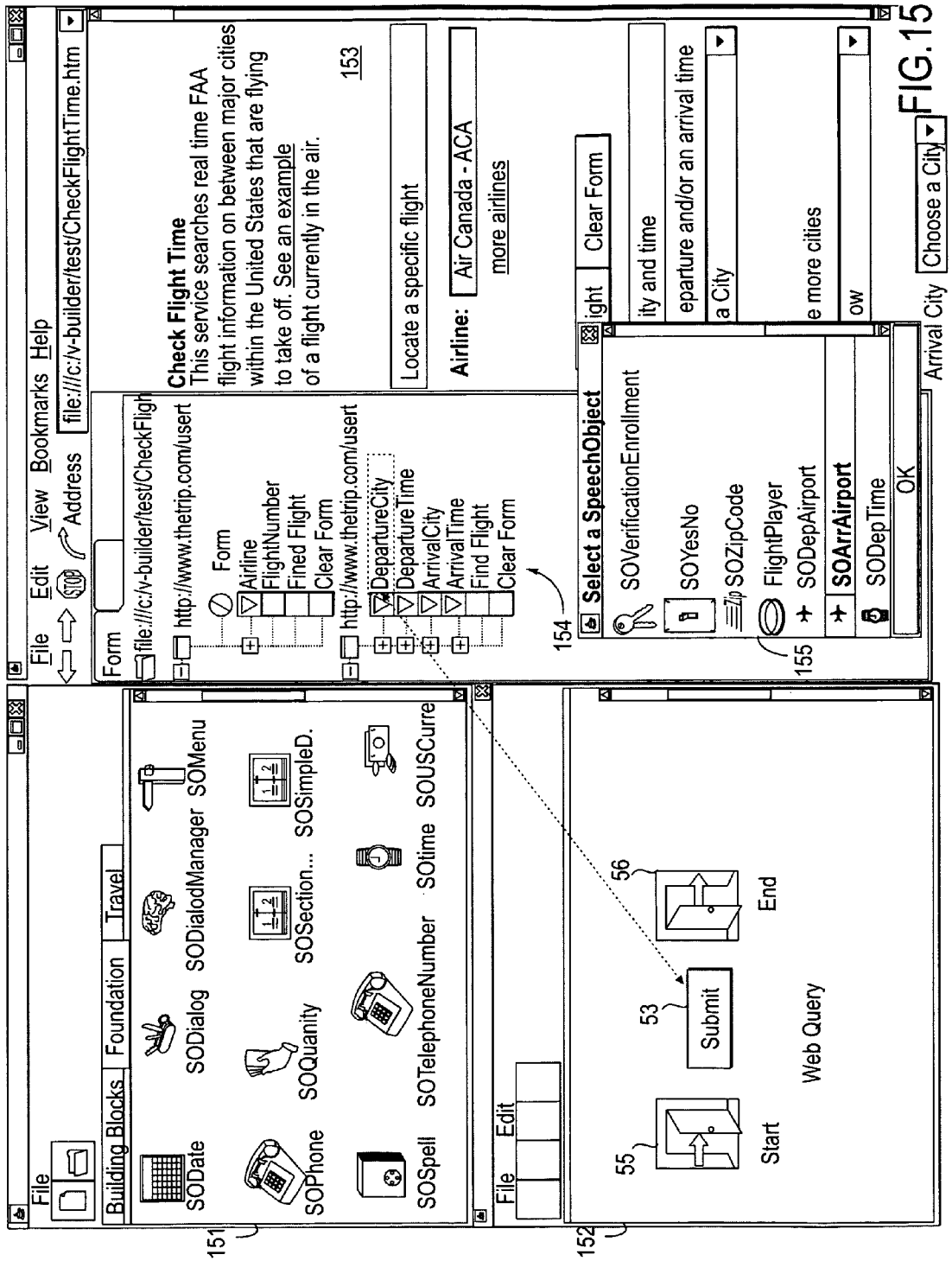
FIG. 15 shows a display including a Web page customizer, a dialog editor window, a speech object palette, and a tree representing the Web page.

FIG. 15 shows an example of a design-time display, including a speech object palette 151, a dialog flow editor window 152, and a Web page customizer 153. To facilitate this feature, QueryEdit further includes the capability to visually represent the Web page as a tree hierarchy. In FIG. 15, tree 154 represents the Web page displayed in customizer 153. The tree can be constructed based on the tags of the HTML page and/or strings associated with such tags, to display significant elements on the Web page, such as forms, tables, etc. In this way, tags that are irrelevant to a speech application can be filtered out, to avoid displaying unnecessary information to the developer. The tree representation 154 includes intuitive icons and representative strings to display the significant elements on the Web page. When appropriate, a level of a tree can be expanded to show additional levels hierarchically included within it.

Assume that the developer wishes to incorporate into the dialog flow a speech object corresponding to the field "DepartureCity" in the Web page. Accordingly, the developer simply drags and drops the string "DepartureCity" from the tree 154 to the location in the dialog flow editor window 152 at which he wishes the speech object to be located. In response, a pop-up window 155 is displayed with a list of selectable speech objects, with the best guess highlighted ("SODepAirport" in this case). The user can then accept the choice or select another speech object from the list. Whichever speech object is selected is then automatically incorporated into the dialog flow at the specified point and is represented at the appropriate point in the dialog flow editor window 152.

An object called a Field Formatter is provided to solve the problem that a given HTML field can map to one or more speech object properties, and one speech object property can map to one or more HTML fields. For example, SOStreetNumber and SOStreet may map to one Address field on a Web page, and SODate may map to separate day, month, and year fields on a Web page. The Field Formatter can also resolve mismatches in data representation between speech objects and the associated HTML fields. For example, the phone number might be represented by digits in a speech object, but by digits, parentheses and dashes in the associated HTML fields. Hence, the Field Formatter provides a field formatting language to allow the developer to make adjustments to data formats to resolve such mismatches. The details of such formatting language are not required for an understanding of the present invention. The Field Formatter will also map numbers represented in digits to their equivalent word representations (e.g. "7" is mapped to "seven") and a reverse mapping in the grammar will map "six dollars and fifty cents" to "6.50" in the HTML field. The Field Formatter also solves the problem of removing or replacing special characters from HTML fields that may present a problem to a TTS engine. Further, the above-described interface that enables the developer to specify text in a Web page for playback may be implemented through the Field Formatter.

FIG. 8 illustrates the logical relationship between the Field Formatter and other associated objects. In particular, the Field Formatter 82 logically is an interface between a given speech object 81 and an instance of QueryEdit 83, which defines a query to the Web page 84. Referring to FIG. 9, the Field Formatter 82 includes both design-time and runtime modules, i.e., customizer 83 and runtime unit 84. The runtime unit 84 is a processing object which acts as a filter. It "knows" which field or fields to extract from the Dialog Context, how to manipulate them, and how to store the results in an instance of Dialog Context. In at least one embodiment, the Field Formatter is a component of every speech object.

Figure 10A:
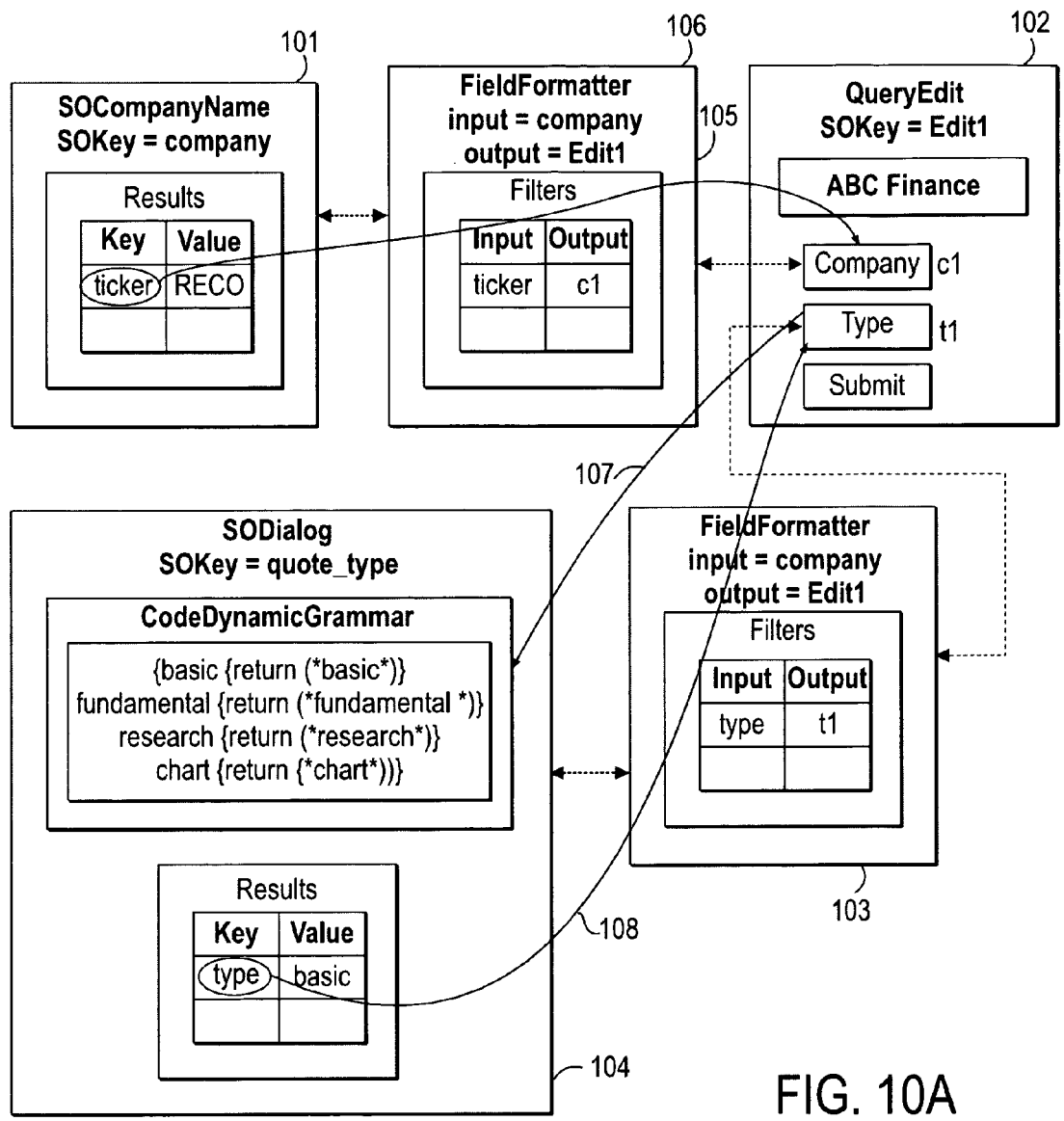
FIG. 10A shows user inputs associated with defining the inputs of a QueryEdit processing object.

Operation of the Field Formatter is as follows. When the developer drags between a field in the speech object customizer and a field in Web page, a dialog box is displayed representing the Field Formatter customizer. Alternatively, the developer may be given the ability to select a Field Formatter object from the Toolbox, drag it into the dialog flow, and double-click on it to activate its customizer. As another alternative, the Field Formatter may be accessed through a dedicated tab pane in the speech object's customizer. An example of the Field Formatter customizer is shown in FIG. 10A, as dialog box 106. The Field Formatter customizer has two fields: one field ("Input") is the name of the output parameter that will be inserted in the Dialog Context; the other field is the formula that is used to manipulate the input fields to give that output field. The name field is pre-filled with a reasonable guess, such as "QueryDate1", which is the key used to store this field in the Dialog Context. The formula field ("Output") contains symbols which represent the field(s) dragged between the customizers, e.g., "d=s1 s2 s3". In this example, the name field is to the left of the equals sign ("=") and the formula field is on the right. This means that one customizer is mapping a single field, designated "d", to 3 fields in the other customizer, designated "s1", "s2" and "s3". Note that the fields are always strings.

The developer drags fields from the (upstream) speech object's customizer to the formula field of the Field Formatter, and one field from the (downstream) QueryEdit customizer to the name field of the Field Formatter. The developer can use the field formatting language to manipulate the mapping. The default operation is concatenation. A simple operation is insertion of characters, e.g. "d=(s1) s2–s3" maps a phone number. More complicated operations might include filtering out characters, e.g., "d=@num(s1 s2 s3)" could strip out non-numeric characters.

Figure 10B:
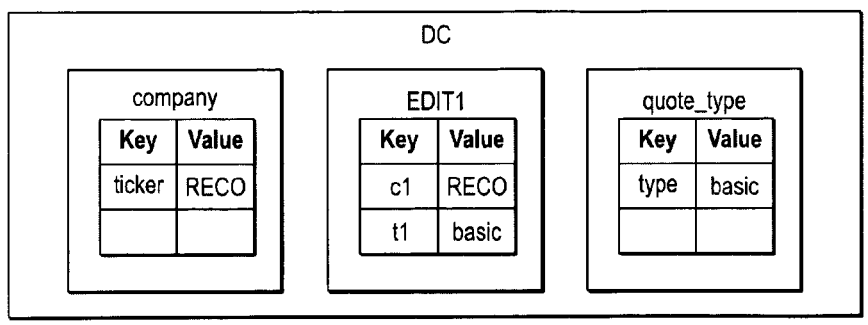
FIG. 10B illustrates a Dialog Context associated with FIG. 10A.

Referring again to FIGS. 10A and 10B, an example of how fields in a Web page can be mapped to speech object properties is further illustrated. FIGS. 10A and 10B show the setting up of a speech-based request for a stock quote. FIG. 10A specifically illustrates how QueryEdit is used to set up the inputs to QueryRun, i.e., company name and quote type, from upstream speech objects. FIG. 10B illustrates the Dialog Context associated with this input to QueryRun for this example.

Initially, the developer double-clicks on the QueryRun object in the dialog flow to bring up its customizer, QueryEdit. The QueryEdit window allows the developer to enter the URL of the Web page to which the associated instance of QueryRun will be linked. In response to this user input, QueryEdit displays the fields of the specified Web page. To set up the inputs to QueryRun, the developer drags and drops the appropriate key fields from the upstream speech objects to the corresponding HTML fields in QueryEdit. These user inputs are interpreted by QueryEdit, which saves the specified mapping. In at least one embodiment, the mapping is persisted as Java properties.

In the example of FIG. 10A, the developer drags and drops (105) the key "ticker" in the customizer 101 of the speech object SOCompanyName to the "Company" field in QueryEdit 102 (the customizer for QueryRun). The key "ticker" is the key of the key/value results pair that is returned by the speech object. Similarly, the developer drags and drops (108) the key "type" from a customizer 104 associated with a quote type speech object to a "type" field of QueryEdit 102. Field Formatters 106 and 103 can be used to modify the mapping of company name and quote type, respectively, if desired.

The Field Formatter object also includes the ability to generate dynamic grammars. In this example, it is assumed that no prepackaged speech object is available for acquiring the type of desired stock quote from a speaker. Accordingly, a generic speech object SODialog is configured to acquire this information. In response to the developer's dragging and dropping (107) the "type" field in QueryEdit 102 into the customizer 104 of SODialog, the default grammar is generated and displayed in customizer 104, based on the nature of the Web page field. For example, if the Web page field being dragged represents a pull down list of selectable items, then the default grammar may simply consist of the names of each of those items as alternatives that may be spoken by the speaker. The developer may modify the default grammar, as appropriate. For example, the Web page field "type" may represent a pull-down list from which the user may select from the quote types, "basic", "fundamental," "research", and "chart". Accordingly, a simple dynamically generated grammar for "Type" might consist those four items as alternatives.

Figure 11A:
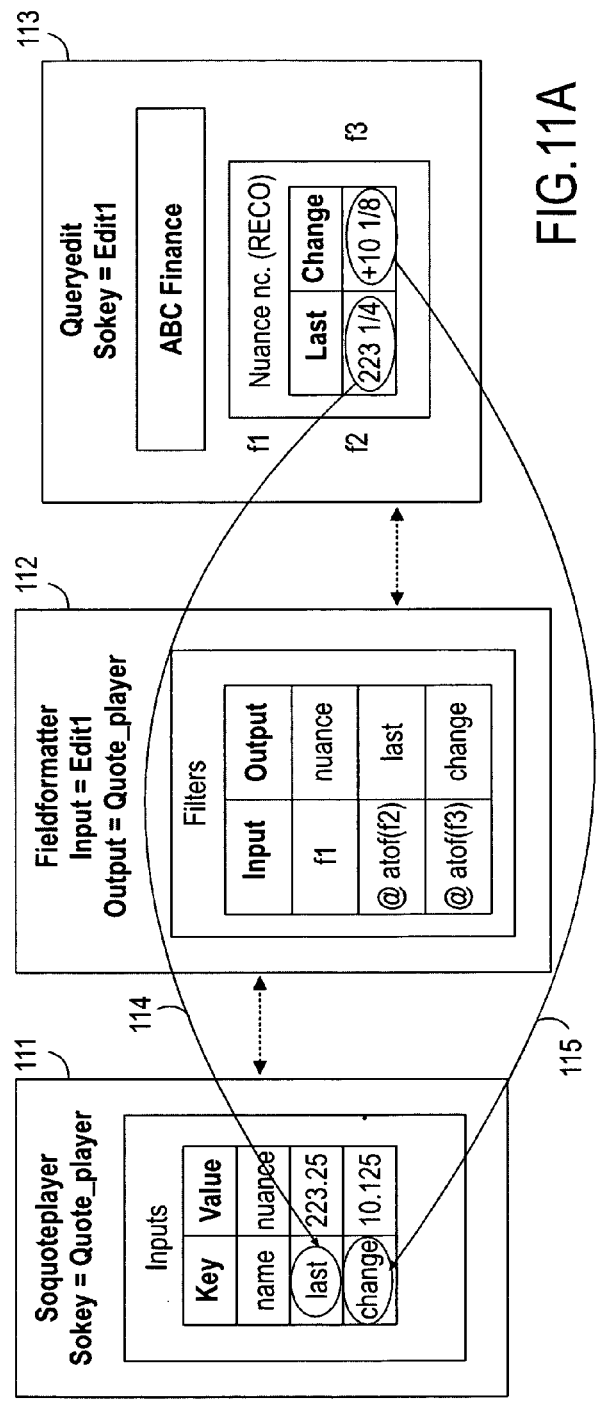
FIG. 11A illustrates user inputs associated with defining the output of a QueryEdit processing object.
Figure 11B:
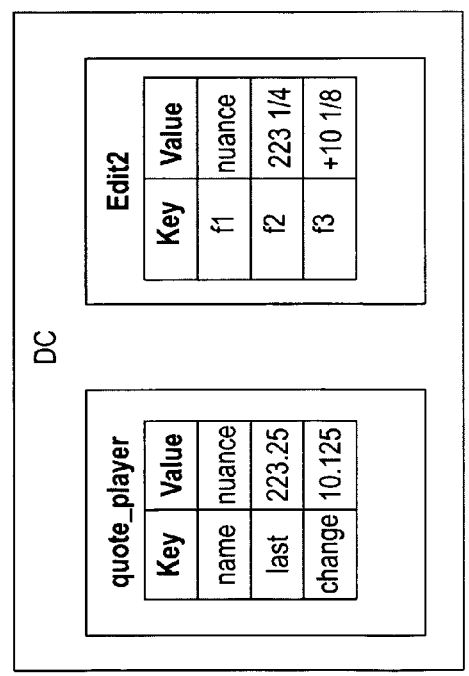
FIG. 11B illustrates a Dialog Context associated with FIG. 11A.

FIGS. 11A and 11B show how the result of a Web page query is set up, for the same example as referred to in FIGS. 10A and 10B. FIG. 11A specifically illustrates how QueryEdit is used to specify how the outputs of QueryRun (i.e., the stock price and change value) are provided to the downstream speech object, which in this case is the object SOQoutePlayer. SOQuotePlayer is designed to audibly "speak" the stock price to the requestor. FIG. 11B illustrates the Dialog Context associated with the output of QueryRun for this example.

Referring to FIG. 11A, to set up the output of QueryRun, the developer first initiates an actual query of the Web page in the conventional (non-spoken) manner, i.e., by manually entering and submitting a query. The results are displayed in the QueryEdit window 113. The developer than drags and drops the appropriate HTML field or fields from the results page to the corresponding key field or fields in the customizer of the speech object. These key fields are the keys of the key/value pairs for the inputs of the downstream speech object. These user inputs are interpreted by QueryEdit, which saves the specified mapping as Java properties, VXML, or any other supported representation. In the illustrated example, the developer drags (114) the actual returned stock price value to the corresponding key field "last" of the input to SOQuotePlayer. Similarly, the developer drags (115) the actual returned value of the change in stock price to the corresponding key field "change" of SOQuotePlayer.

Figure 13:
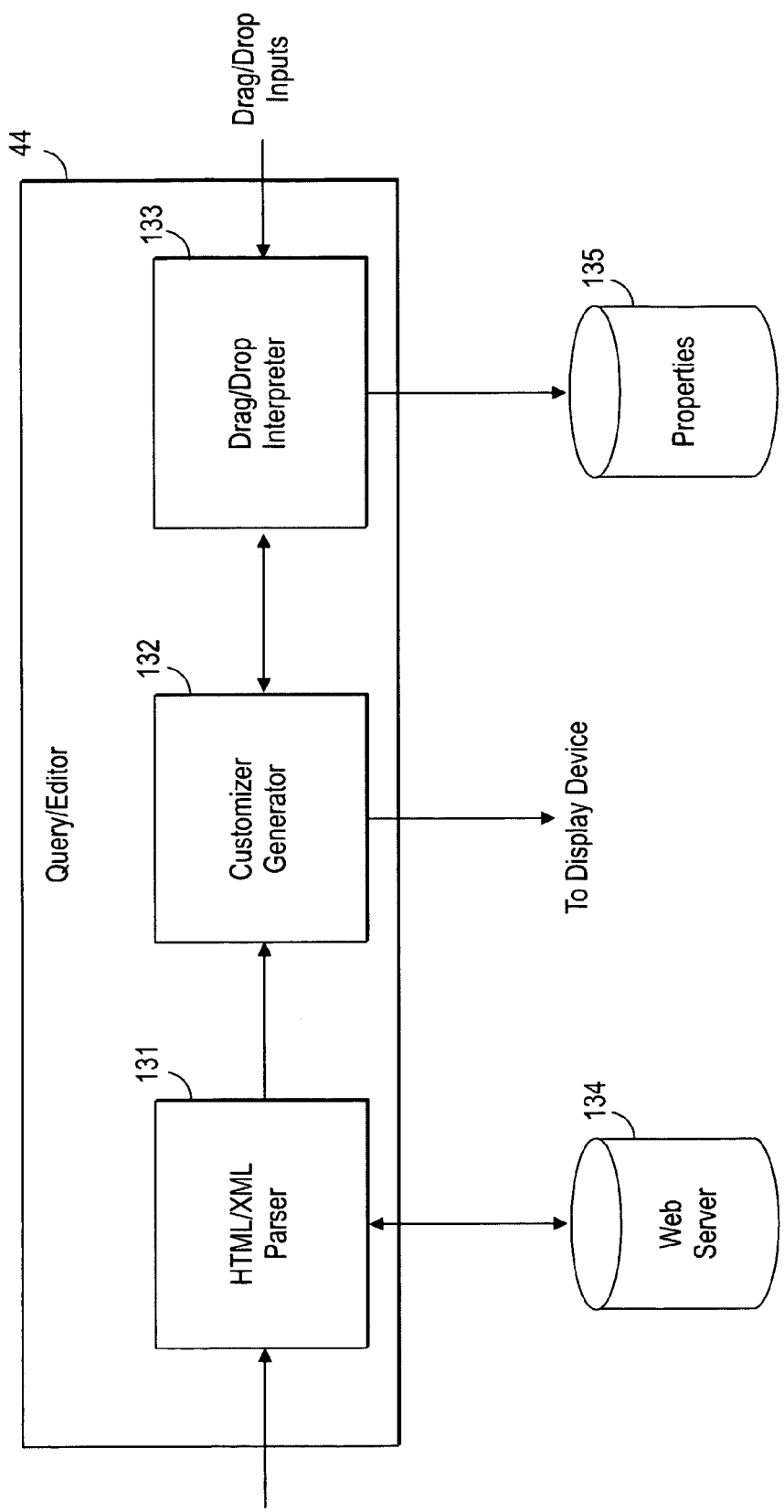
FIG. 13 is a block diagram illustrating the components and operation of the query editor.

FIG. 13 is a block diagram illustrating the components and operation of the query editor 44 (i.e., QueryEdit), according to at least one embodiment. The query editor 44 includes an HTML/XML parser 131, a customizer generator 132, and a drag-and-drop interpreter 133. In response to receiving a Web page URL, the parser 131 locates the appropriate Web server 134 and downloads the referenced Web page. The Web page is provided to the customizer generator 132, which causes a customizer for that Web page to be displayed as an instance of QueryEdit. The drag-and-drop interpreter 133 receives user inputs directed to the displayed customizer and relating to the mapping of HTML fields to speech object properties. In a least one embodiment, the mapping information is persisted as Java properties. Hence, the drag-and-drop interpreter 133 saves the user-defined correspondences between HTML field and speech object properties in a properties database 135.

Figure 14:
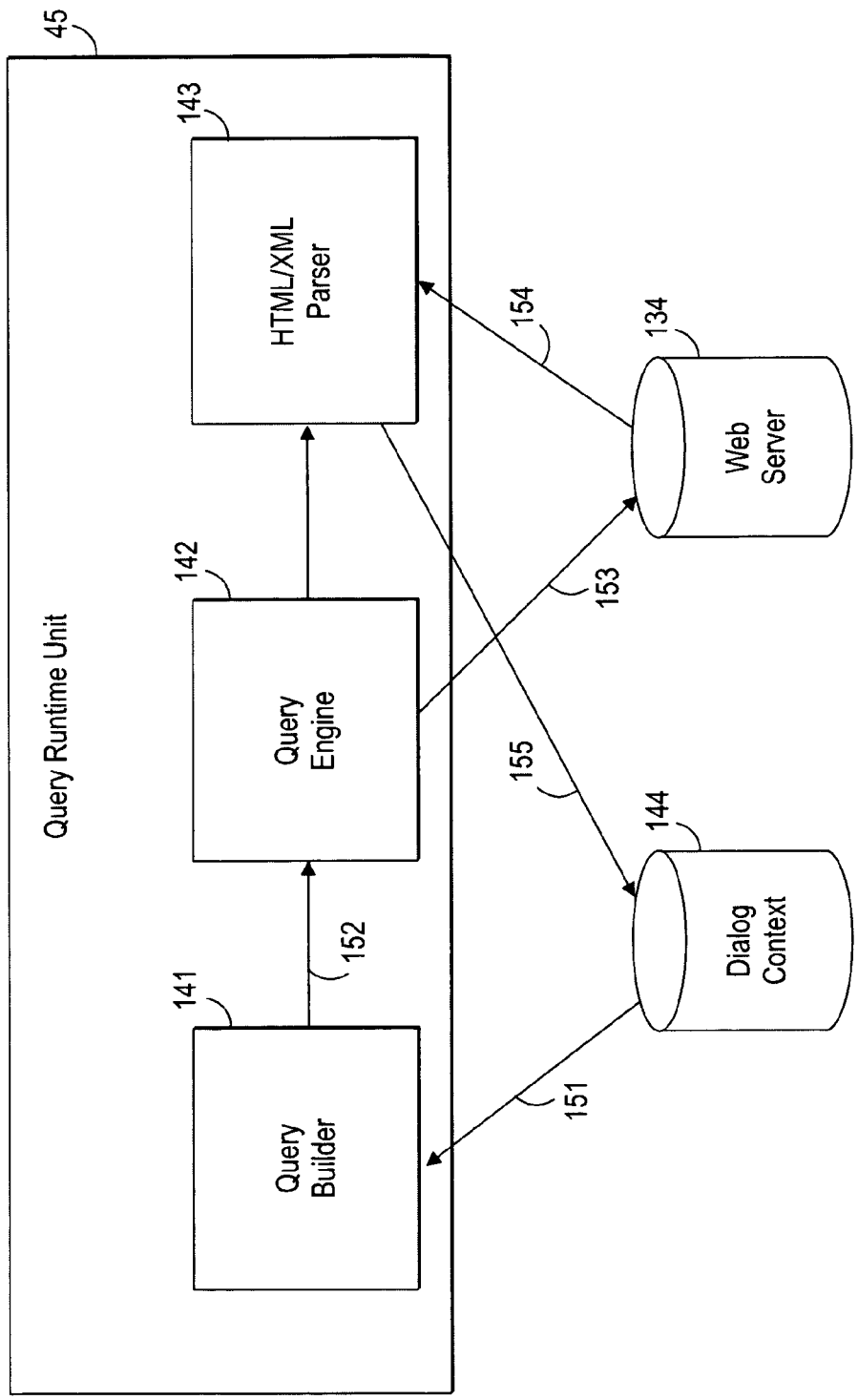
FIG. 14 is a block diagram illustrating the components and operation of the query run-time unit.

FIG. 14 is a block diagram illustrating the components and operation of the query run-time unit 45 (i.e., QueryRun), according to at least one embodiment. The query runtime unit 45 includes a query builder 141, a query engine 142, and an HTML/XML parser 143. The illustrated components are activated when an instance of QueryRun is invoked during execution of a dialog. Hence, at runtime QueryRun will receive an instance of a Dialog Context 144 when its invoked method is called (151). As noted above, the Dialog Context is a key/value structure which contains the fields required to execute the Web query, and the keys are specified at design time. The query builder 141 then constructs an appropriate Web page query in response to the inputs received from the Dialog Context 144 and provides (152) the query to the query engine 142. The query engine 142 performs the query by accessing (153) the appropriate Web page on the Web server 134 (using, for example, conventional Get and Post commands), and the results of the query are provided (154) to the parser 143 as HTML or XML. The HTML/XML parser 143 then parses the results into data elements and provides (155) the data elements to the Dialog Context 144.

Thus, a method and apparatus have been described for allowing a developer to graphically author a dialog flow for use in a voice response system and to graphically create an operational link between a hypermedia page, such as a World Wide Web ("Web") page, and a speech object. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A computer-implemented graphical design tool configured to allow a user of a computer system to graphically create an operational link between a hypermedia page and a component defining a spoken dialog interaction between a person and a machine.

2. A computer-implemented graphical design tool as recited in claim 1, wherein the hypermedia page comprises a World Wide Web page.

3. A computer-implemented graphical design tool as recited in claim 2, wherein the component comprises a speech object.

4. A computer-implemented graphical design tool as recited in claim 1, wherein the tool is configured to allow the user to graphically map a field of a hypermedia page to a property of a speech object.

5. A computer-implemented graphical design tool as recited in claim 1, wherein the component comprises a speech object.

6. A computer-implemented graphical design tool as recited in claim 4, wherein the speech object comprises a grammar and a set of prompts associated with the grammar.

7. A computer-implemented tool for allowing a user of a computer system to specify an operational link between a hypermedia page and a component defining a dialog interaction between a person and a machine, the tool comprising:
    an editor configured to allow a user to specify a correspondence between an element of said component and an element of the hypermedia page; and
    a runtime unit configured to functionally link said component with the hypermedia page during execution of the dialog, according to the specified correspondence.

8. A computer-implemented tool as recited in claim 7, wherein the editor is configured to allow the user to specify the correspondence graphically.

9. A computer-implemented tool as recited in claim 7, wherein the hypermedia page comprises a World Wide Web page.

10. A computer-implemented tool as recited in claim 7, wherein the hypermedia page comprises a World Wide Web page and the component comprises a speech object.

11. A computer-implemented tool as recited in claim 10, wherein the editor is further configured to:
- receive a user input specifying a field of the hypermedia page; and
- respond to the user input by automatically selecting an appropriate speech object from a set of selectable speech objects, based on said field.

12. A computer-implemented tool as recited in claim 7, wherein the component comprises a speech object.

13. A computer-implemented tool as recited in claim 11, wherein the speech object comprises a grammar and a set of prompts associated with the grammar.

14. A computer-implemented graphical design tool for allowing a user of a computer system to graphically specify an operational link between a hypermedia page and a component that defines a spoken dialog interaction between a person and a machine, the tool comprising:
- an editor configured to allow a user to specify a correspondence between an element of said component and an element of the hypermedia page; and
- a runtime unit configured to functionally link said component with the hypermedia page during execution of the spoken dialog according to the specified correspondence.

15. A computer-implemented tool as recited in claim 14, wherein the hypermedia page comprises a World Wide Web page.

16. A computer-implemented tool as recited in claim 15, wherein said element of the hypermedia page is a field of the World Wide Web page.

17. A computer-implemented tool as recited in claim 14, wherein the hypermedia page comprises a World Wide Web page and the component comprises a speech object.

18. A computer-implemented tool as recited in claim 14, wherein the component comprises a speech object.

19. A computer-implemented tool as recited in claim 18, wherein said element of the component is a property of the speech object.

20. A computer-implemented tool as recited in claim 18, wherein the speech object comprises a grammar and a set of prompts associated with the grammar.

21. A tool for allowing a user of a computer system to specify an operational link between a hypermedia page and a component that defines a dialog interaction between a person and a machine, the tool comprising:
- means for allowing a user to specify a correspondence between an element of the component and an element of the hypermedia page; and
- means for functionally linking the component with the hypermedia page during execution of the dialog according to the specified correspondence.

22. A tool as recited in claim 21, wherein the hypermedia page comprises a World Wide Web page.

23. A tool as recited in claim 22, wherein said element of the hypermedia page is a field of the World Wide Web page.

24. A tool as recited in claim 21, wherein the hypermedia page comprises a World Wide Web page and the component comprises a speech object.

25. A tool as recited in claim 21, wherein the component comprises a speech object.

26. A tool as recited in claim 25, wherein the speech object comprises a grammar and a set of prompts associated with the grammar.

27. A tool as recited in claim 26, wherein said element of the component is a property of the speech object.

28. A tool as recited in claim 25, wherein the element of said hypermedia page is a field of the hypermedia page, the tool further comprising:
- means for receiving a user input specifying the field of the hypermedia page; and
- means for responding to the user input by automatically selecting an appropriate speech object from a set of selectable speech objects, based on said field.

29. A tool for authoring content for use in a voice response system, the tool comprising:
- a first editor configured to allow a user to specify a spoken dialog between a person and a machine from a set of user-selectable components defining spoken dialog interactions; and
- a second editor configured to allow the user to specify operational links between hypermedia pages and said components.

30. A tool as recited in claim 29, wherein the first editor is configured to allow the user to graphically specify the spoken dialog, and the second editor is configured to allow the user to graphically specify the operational links.

31. A tool as recited in claim 29, wherein the hypermedia pages comprise World Wide Web pages.

32. A tool as recited in claim 29, wherein the set of user-selectable components comprises a set of speech objects.

33. A tool as recited in claim 29, wherein the hypermedia pages comprise World Wide Web pages and the set of components comprise a set of speech objects.

34. A tool as recited in claim 33, wherein each of the set of speech objects comprises a grammar and a set of prompts associated with the grammar.

35. A tool as recited in claim 29, further comprising a runtime unit configured to functionally link the set of components with the hypermedia pages during execution of the spoken dialog according to the specified links.

36. A tool for authoring content for use in a voice response system, the tool comprising:
- a first editor configured to allow a user to specify a dialog between a person and a machine from a set of user-selectable components defining dialog interactions; and
- a hypermedia query mechanism including
  - a second editor configured to allow a user to specify a correspondence between an element of a selected one of the components and an element of a hypermedia page, and
  - a runtime unit configured to functionally link the selected one of the components with the hypermedia page during execution of the dialog according to the specified correspondence.

37. A tool as recited in claim 36, wherein the first editor is configured to allow the user to specify the dialog graphically.

38. A tool as recited in claim 37, wherein the second editor is configured to allow the user to specify the correspondence graphically.

39. A design tool for authoring content for use in a voice response system, the tool comprising:
- a first editor configured to provide a first graphical user interface allowing a user to graphically specify a spoken dialog between a person and a machine from a set of user-selectable components, each component for defining a spoken dialog interaction; and
- a query mechanism including
  - a second editor configured to provide a second graphical user interface allowing the user to specify correspondences between properties of any of said components and fields of one or more hypermedia pages, and a runtime unit configured to functionally link said components and said hypermedia pages during execution of the spoken dialog according to the specified correspondences.

40. A design tool as recited in claim 39, wherein each of the set of user-selectable components is a speech object.

41. A design tool for authoring content for use in a voice response system, the tool comprising:
a first editor configured to provide a first graphical user interface allowing a user to graphically specify a spoken dialog flow between a person and a machine from a set of user-selectable speech objects, the speech objects each for defining a spoken dialog interaction between a person and a machine; and
a Web query mechanism including
a second editor configured to provide a second graphical user interface allowing the user to specify correspondences between properties of any of said speech objects and fields of one or more World Wide Web pages, and
a runtime unit configured to functionally link said speech objects and said World Wide Web pages during execution of a spoken dialog according to the specified correspondences.

42. A design tool as recited in claim 41, wherein at least one of the set of user-selectable components is a speech object.

43. A design tool as recited in claim 41, wherein the Web query mechanism is further configured to:
receive a user input directed to a field of a Web page; and
respond to the user input by automatically selecting an appropriate speech object from a set of selectable speech objects, based on said field.

44. A method of allowing a user of a computer system to create content for use in a voice response processing system, the method comprising:
receiving user input specifying a correspondence between an element of a hypermedia page and an element of a component that represents a spoken dialog interaction between a person and a machine; and
storing data representative of the correspondence based on the user input, the data for use during execution of the spoken dialog.

45. A method as recited in claim 44, further comprising, during execution of the spoken dialog, automatically creating a functional link between the component
and the hypermedia page according to the specified correspondence.

46. A method as recited in claim 44, wherein the hypermedia page comprises a World Wide Web page.

47. A method as recited in claim 46, wherein said element of the hypermedia page is a field of the World Wide Web page.

48. A method as recited in claim 44, wherein the hypermedia page comprises a World Wide Web page and the component comprises a speech object.

49. A method as recited in claim 44, wherein the component comprises a speech object.

50. A method as recited in claim 49, wherein said element of the component is a property of the speech object.

51. A method as recited in claim 49, wherein the speech object comprises a grammar and a set of prompts associated with the grammar.

52. A method of allowing a user of a computer system to specify an operational link between a hypermedia page and a component that represents a dialog interaction between a person and a machine, the method comprising:
receiving user input specifying a correspondence between a property of the component and a field of the hypermedia page;
during execution of the dialog, automatically creating a functional link between the component and the hypermedia page according to the specified correspondence.

53. A method as recited in claim 52, wherein said user input comprises a drag-and-drop operation between a customizer of the component and a customizer associated with the hypermedia page.

54. A method as recited in claim 52, wherein the hypermedia page comprises a World Wide Web page.

55. A method as recited in claim 52, wherein the hypermedia page comprises a World Wide Web page and the component comprises a speech object.

56. A method as recited in claim 52, wherein the component comprises a speech object.

57. A method as recited in claim 56, wherein the speech object comprises a grammar and a set of prompts associated with the grammar.

58. A method of allowing a user of a computer to create content for use in a voice response system, the method comprising:
receiving first user input graphically specifying a spoken dialog between a person and a machine, the first user input including inputs directed to a set of user-selectable components defining spoken dialog interactions;
storing first data representing a dialog flow for the spoken dialog based on the first user input;
receiving second user input graphically specifying a correspondence between a field of a hypermedia page and a property of one of said components; and
storing second data representing the correspondence based on the second user input, wherein the first data and the second data are for use by the voice response system to execute the spoken dialog.

59. A method as recited in claim 58, further comprising:
receiving third user input selecting a field of the hypermedia page; and
in response to the third user input, automatically identifying a component of said set of user-selectable components, for inclusion in the spoken dialog.

60. A method as recited in claim 58, further comprising:
receiving third user input specifying a portion of the hypermedia page that is to be text-to-speech converted at run-time; and
in response to the third user input, enabling text-to-speech conversion of the specified portion of the Web page.

61. A method as recited in claim 58, wherein the hypermedia page comprises a World Wide Web page.

62. A method as recited in claim 61, wherein the hypermedia page comprises a World Wide Web page and the set of components comprises a set of speech objects.

63. A method as recited in claim 58, wherein the set of user-selectable components comprises a set of speech objects.

64. A method as recited in claim 63, wherein each of the set of speech objects comprises a grammar and a set of prompts associated with the grammar.

65. A method of allowing a user of a computer to create content for use in a voice response system, the method comprising:

enabling the user to create graphically a dialog flow for a spoken dialog between a person and a machine by allowing the user to graphically specify a set of visually-represented speech objects to define the dialog; and enabling the user to establish graphically a functional link between a hypermedia page and one of the speech objects by allowing the user to incorporate graphically an object of a predetermined type into the dialog flow, the object of the predetermined type specifying a correspondence between an element of a hypermedia page and an element of one of the speech objects.

66. A method as recited in claim 65, wherein the object of the predetermined type specifies a correspondence between a field of the hypermedia page and a property of the speech object.

67. A method as recited in claim 66, wherein said enabling the user to establish the functional link comprises enabling the user to specify graphically the correspondence using drag-and-drop inputs.

68. A method as recited in claim 65, wherein said enabling the user to establish the functional link comprises enabling the user to specify graphically the correspondence using drag-and-drop inputs.

69. A method as recited in claim 65, wherein said enabling the user to create graphically a dialog flow comprises:

receiving user input selecting a field of the hypermedia page; and in response to the third user input, automatically identify an appropriate one of the speech object, for inclusion in the spoken dialog.

70. A method as recited in claim 65, wherein said enabling the user to establish graphically a functional link between a hypermedia page and one of the speech objects comprises:

receiving user input specifying a portion of the hypermedia page that is to be text-to-speech converted as part of a response to a Web query; and in response to the third user input, enabling text-to-speech conversion of the specified portion of the Web page to be performed in response to a Web query.

\* \* \* \* \*